(12) United States Patent
Mater et al.

(10) Patent No.: US 8,021,466 B2
(45) Date of Patent: Sep. 20, 2011

(54) FLUID FLOW FILTER AND METHOD OF MAKING AND USING

(75) Inventors: Dennis L. Mater, Glen Allen, VA (US); Steve Hawkins, Midlothian, VA (US)

(73) Assignee: Carpenter Co., Richmond, VA (US)

( * ) Notice: Subject to any disclaimer, the term of this patent is extended or adjusted under 35 U.S.C. 154(b) by 410 days.

(21) Appl. No.: 12/076,443

(22) Filed: Mar. 18, 2008

(65) Prior Publication Data

US 2009/0235624 A1    Sep. 24, 2009

(51) Int. Cl.
*B01D 39/02* (2006.01)
*B01D 46/00* (2006.01)

(52) U.S. Cl. ............... 95/273; 55/521; 55/527; 55/528; 264/286

(58) Field of Classification Search .............. 55/523, 55/524, 525, 526, 527, 528, 521, 497, 483, 55/484, DIG. 46, DIG. 42; 210/483, 488, 210/490, 496, 503, 506, 508; 442/327–417; 95/273

See application file for complete search history.

(56) References Cited

U.S. PATENT DOCUMENTS

| | | |
|---|---|---|
| 178,103 A | 4/1876 | Bracher |
| 795,359 A | 7/1905 | Moore |
| 1,802,941 A | 4/1931 | Drager |
| 2,019,186 A | 10/1935 | Kaiser |
| 2,486,728 A | 11/1949 | Agad |
| 2,567,030 A | 9/1951 | Schaaf |
| 2,833,416 A | 5/1958 | Wilkinson |
| 2,835,340 A | 5/1958 | McGuff et al. |
| 3,025,963 A | 3/1962 | Bauer |
| 3,490,211 A | 1/1970 | Cartier |
| 3,624,161 A | 11/1971 | Bub |
| 3,679,537 A | 7/1972 | Huer et al. |
| 4,007,745 A | 2/1977 | Randall et al. |
| 4,094,787 A | 6/1978 | Giordano |

(Continued)

FOREIGN PATENT DOCUMENTS

DE        43 00 400 A1     7/1993

(Continued)

OTHER PUBLICATIONS

Webster's Ninth New Collegiate Dictionary, 1986.*

*Primary Examiner* — Duane Smith
*Assistant Examiner* — Thomas McKenzie
(74) *Attorney, Agent, or Firm* — Smith, Gambrell, Russell, llp

(57) ABSTRACT

A filter well suited for paint arrestor usage having a monolithic high loft manmade fiber body with a convoluted flow contact surface. The filter is preferably formed by a convoluter as in one with a roller set and blade cutter to form mirror image fiber filter sheets from a received fiber batt. Provided is a well mixed proper fiber blend, such as one having a set of fibers made of a majority of course fibers joined by way of thermal bonding fibers which facilitate, during convoluting, formation of a crisp cut and high integrity three dimensional surface, as in one of rows of peaks separated by valleys. The projection/recess arrangement over the flow contact surface as well as the thickness and relative projection-to-base dimensions are arranged to provide a high paint holding capacity without too fast a load up of, for example, paint particles and while avoiding too great of a pressure drop within that load up time.

33 Claims, 12 Drawing Sheets

U.S. PATENT DOCUMENTS

| | | | |
|---|---|---|---|
| 4,102,792 | A | 7/1978 | Harris |
| 4,211,661 | A | 7/1980 | Perry |
| 4,257,783 | A | 3/1981 | Gutjahr et al. |
| D264,241 | S | 5/1982 | Lovett |
| 4,493,718 | A | 1/1985 | Schweizer |
| 4,603,445 | A | 8/1986 | Spann |
| 4,701,197 | A | 10/1987 | Thornton et al. |
| 4,772,443 | A | 9/1988 | Thornton et al. |
| 4,795,481 | A | 1/1989 | Ellis |
| 4,799,944 | A | 1/1989 | Dixon et al. |
| 4,874,412 | A | 10/1989 | Nowack |
| 4,908,052 | A | 3/1990 | Largman et al. |
| 5,034,042 | A | 7/1991 | Allen, Jr. |
| 5,049,172 | A | 9/1991 | Shary et al. |
| 5,192,602 | A | 3/1993 | Spencer et al. |
| 5,288,402 | A * | 2/1994 | Yoshida .................. 210/488 |
| 5,532,050 | A | 7/1996 | Brooks |
| 5,643,507 | A | 7/1997 | Berrigan et al. |
| 5,658,640 | A | 8/1997 | Berrigan et al. |
| 5,658,641 | A | 8/1997 | Berrigan et al. |
| 5,720,790 | A * | 2/1998 | Kometani et al. .............. 55/497 |
| 5,882,522 | A | 3/1999 | Matsumoto et al. |
| 5,922,130 | A | 7/1999 | Mosser et al. |
| 6,017,377 | A | 1/2000 | Brown et al. |
| 6,071,419 | A * | 6/2000 | Beier et al. .................... 210/767 |
| 6,159,258 | A | 12/2000 | Ager et al. |
| 6,214,076 | B1 | 4/2001 | Beier et al. |
| 6,231,646 | B1 | 5/2001 | Schweitzer et al. |
| 6,231,976 | B1 * | 5/2001 | Dean et al. .................... 428/373 |
| 6,273,938 | B1 * | 8/2001 | Fanselow et al. ................. 95/90 |
| 6,387,144 | B1 | 5/2002 | Jaroszczyk et al. |
| 6,409,805 | B1 | 6/2002 | Beier et al. |
| 6,468,324 | B1 | 10/2002 | Beier |
| 6,500,292 | B1 | 12/2002 | Mossbeck et al. |
| 6,740,610 | B2 * | 5/2004 | Mossbeck et al. ........... 442/366 |
| 6,758,878 | B2 * | 7/2004 | Choi et al. ..................... 55/497 |
| 6,790,397 | B2 * | 9/2004 | Richerson et al. ........... 264/154 |
| 6,878,193 | B2 * | 4/2005 | Kasmark, Jr. .................. 96/135 |
| 6,923,911 | B1 * | 8/2005 | Beier et al. .................... 210/273 |
| 7,097,694 | B1 | 8/2006 | Jaroszczyk et al. |
| 7,186,287 | B2 * | 3/2007 | Beier .............................. 55/483 |
| 7,452,589 | B2 * | 11/2008 | Mossbeck et al. ........... 428/186 |
| 2002/0139098 | A1 | 10/2002 | Beier |
| 2004/0163370 | A1 | 8/2004 | Haufe et al. |
| 2004/0213917 | A1 | 10/2004 | Courtney |
| 2005/0178268 | A1 | 8/2005 | Beier |
| 2006/0000196 | A1 * | 1/2006 | Beier et al. ..................... 55/497 |
| 2006/0016753 | A1 | 1/2006 | Sowemimo-Coker et al. |
| 2008/0283476 | A1 | 11/2008 | Dralle |

FOREIGN PATENT DOCUMENTS

| | | |
|---|---|---|
| EP | 0724 473 | 8/1993 |
| FR | 2 264 645 | 10/1975 |
| JP | 6-233907 | 8/1994 |
| WO | 95/05232 | 2/1995 |

* cited by examiner

FLUID FLOW FILTER AND METHOD OF MAKING AND USING

FIELD OF THE INVENTION

The present invention relates generally to filters for fluid streams and methods of making and using the same. The subject matter of the present invention is inclusive of three dimensional surfaced filters of non-woven material with a suitable fiber constitution. The fiber batt recipe used in the construction of the filters is well suited for forming the filters in a convoluting process and for use of the filters as a paint arrestor.

BACKGROUND

Many materials and combinations of materials have been utilized as filtration media for fluid filters to remove solid or liquid particulate from fluid streams. Fluid filters are found in use in commercial spray booths such as commercial paint spray booths and, when so utilized, are known in the art as paint arrestors. The commercial paint spray booths utilize controlled airflow to direct overspray away from the article being painted. This overspray is then exhausted from the booth through a filtration system comprising paint arrestors.

The performance or capabilities of such fluid filters are generally judged according to three main criteria:
 A) Particulate Removal Efficiency;
 B) Holding Capacity; and
 C) Pressure Drop.

Particulate removal efficiency of a filter is the ability of the filter to capture and retain particulate. For example, with respect to paint arrestors, efficiency is a representation of the percentage of the total paint particles entrained in the air stream exiting the booth that are captured by the filter.

Holding capacity is the amount of particulate which can be retained by the filter before the pressure drop becomes so great that the filter must be cleaned or replaced. Typically the test is stopped at 0.5 in. water and this represents the point at which a filter is typically exchanged due to airflow restriction. Proper airflow through the paint spray booth prevents quality issues with the painted surface. Relative to paint arrestors, paint holding capacity is the weight of the paint particles, solubolized, suspended, or in aerosol form, that the filter has captured and held for the time period specified. Paint holding capacity thus is determinative of the effective life of a filter. When dealing with disposable paint arrestors, the effective life has a direct bearing on the overall costs to a paint spray booth operator. Also, testing of paint arrestors also frequently records the amount of "run off" of paint particles from a filter. For example, with a vertically arranged filter, the run off includes particles that impact the filter but are not captured by the filter due to, for example, vertical flow off the filter to an underlying surface as in a liquid drain facility. As the efficiency determination for a filter includes the relative amount of captured paint particles to those generated, any run off prior to the holding capacity being reached results in a lowered efficiency rating for a filter, and thus a desirable filter is one with little run-off.

Pressure drop for a given flow rate of fluid through the filter is utilized as a measure of the power required to move the fluid stream through the media. Thus, for paint arrestors, pressure drop, initial and final, is the pressure differential as measured in the air stream across the filter before loading and after loading with paint. Pressure drop can thus affect the airflow in the booth and the subsequent ability to remove overspray from the paint area.

Spray booths are used in a variety of industrial applications as in the application of paint to many different products. A number of different spray atomizing application techniques can be used in such spray booths or in other spray environments. One of these techniques is an air atomization technique wherein coating or paint particles are mixed with an air stream being ejected from a spray gun and the air stream is directed to the product being coated. Another spray application technique example is an airless atomization technique wherein the coating material is atomized and propelled by hydraulic pressure to the product being coated. Yet another spray application technique example is an electrostatic spraying technique. In a typical electrostatic setting, the product to be coated is grounded and the coating material is atomized (either by an air or airless technique) and is electrically charged. As a result, the coating materials are deposited on the product due to the electrical attraction of charged coating particles to the product being coated.

Regardless of the spray technique that is used, a paint spray booth is commonly employed to contain, for example, evaporating solvents and to capture airborne atomized paint particles to minimize their impact on the environment and to protect painters from being unnecessarily exposed to the solvents and paint particles used in the coating process, particularly those that may be toxic. In fact, the use of spray booths is normally required for most liquid paint spray applications by federal or state regulatory agencies, including, in particular, the U.S. Environmental Protection Agency. Moreover, spray booths tend to enhance the quality of the finish being applied to a product being coated by providing a clean environment for the application of liquid coatings to these products.

In such spray booths, it is desirable to maintain a consistent, steady and uniform flow of air throughout the booth. Among other things, the consistent air flow prevents the accumulation of partially dried overspray on an object being coated so that the appearance of the object is not marred and tends to assist in providing the product with a quality finish. Moreover, spray booths prevent the accumulation of hazardous concentrations of potentially explosive solvent vapors. In fact, environmental clean air standards require that the emissions from spray booths must not include more than certain levels of particulates.

To remove paint particulates from the air being exhausted from a spray booth, a common practice is to employ a replaceable fibrous filter which will trap the majority of these paint particulates. These filters soon become clogged with such particulates so that the air flow through the spray booth tends to be substantially reduced, thus decreasing the air flow past the worker inside the booth and the products being coated. Moreover, the spray booth has to be shut down to replace such clogged filters (once per eight hour shift is not uncommon).

Typical paint arrestors or paint filters utilize flat or two dimensional surfaced sheets of non-woven fiber media. These filters can have laminated scrims, varying densities within the filters, and layers of various non-wovens of different constructions and appearances (e.g., see U.S. Pat. No. 6,231,646 to Schweizer et al.). In some cases, multiple filters of various constructions are used in series. High efficiency final filters can be pleated or sewn into bags to increase surface area, in an effort to lower pressure drop while maintaining higher efficiencies. In many paint spray booths, initial filtration is accomplished using flat sheets of non-wovens of various thicknesses. Expanded papers or laminated non-wovens that are slit and stretched producing voids (commonly referred to as paint pockets), can be added to the flat sheets in an effort to facilitate higher efficiencies and paint holding capacities.

There is utilized in the art disposable fluid filters comprised of a batting of, non-woven, fibrous, fluid material having surface patterns on a fluid contact surface. Examples are found in, for example, U.S. Publication No. 2006/0000196, U.S. Pat. No. 4,007,745 to Randall et al. and U.S. Pat. No. 5,658,641 to Berrigen et al. While U.S. Publication No. 2006/0000196 fails to describe how its filter is formed, each of U.S. '745 and U.S. '641 feature a compression technique wherein the fiber media is fed through a pair of comparison rollers to form a surface pattern on one side of the compressed batting (e.g., U.S. '745 involves a heated patterned roll; while U.S. '641 features one of the two compression rollers traveling at a high speed to form wrinkle indulations in the filter surface).

U.S. Pat. No. 6,071,419 describes first and second fluid permeable layers of non-woven fiber batting with the upstream layer formed with paint pockets as by a slit and stretch technique.

U.S. Pat. Nos. 6,740,610 and 6,500,292 describe a non-woven fiber pad for use in futons, mattresses, upholstery and the like having a convoluted surface formed by cutting a non-woven fiber batt having a plurality of low melt synthetic fibers. The non-woven batt is compressed generally toward a cutting device by a pair of counter-rotating drums having convoluted surfaces. A heated wire cutter is preferably utilized to form the desired contour pattern (reference is made to band saw use as an alternative in the '292 patent). The requirements associated with a comfortable futon or the like (e.g., a smooth skin surface due to surface fusing) are considered far removed from the characteristics associated with a filter such as a paint arrestor as explained in greater detail below.

U.S. Pat. No. 4,772,443 describes a fluid filter formed by manufacturing randomly disposed structure fibers and a thermoplastic binder fiber. The interstices between the fibers are fixed by applying a latex resin to the batting which is described as fixing the pore sizes of the filtering media before the filtering media is molded into the desired shape.

U.S. Pat. No. 6,159,258 discloses air filter elements of foam with an upstream surface area of peaks and valleys.

U.S. Pat. No 4,603,445 to Spann describes convolution assemblies used for contouring foam pads for cushioning purposes. As described in Spann, a convolution machine cuts a single piece of foam into two complementary pieces with contoured surfaces generated by the convoluter cut. The cut is done via a horizontal band saw, usually a smooth, practically continuously honed blade with a wedge shaped support. The resilient material is fed into the convoluter, and is compressed in a defined manner, based on the "tooling". This tooling is assembled on two driven rollers that run parallel and on either side of the convoluter-cutting blade. As the rollers turn, the foam pad is fed into the machine, compressed by the tooling, and cut in the compressed state by the convoluter blade. As the cut resilient material recovers from the compression provided by the convoluter tooling, a contoured cut surface is formed on each separated foam sheet with the three dimensional pattern depending on the design of the tooling (e.g., the formation of sinuous or wave-like ridges). In general, convolution patterns are designed such that the two resultant products obtained are of the same mass, although this does not necessarily have to be the case.

While convoluting foam provides relatively consistent product output each time when the other factors associated with the foam material are maintained consistent, the inventors have determined that there is difficulties associated with convoluting non-woven material in an effort to provide filter media. That is, while a convoluted non-woven fiber layer may be well suited for inclusion within a mattress or the like, it may not be deemed commercially viable for filtering (e.g. a paint arrestor) as there are additional criteria involved with making a commercially viable non-woven fiber filter for use in a setting such as a paint spray booth. In other words, a non-woven fiber material such as one used for a mattress, can have varying density levels throughout its thickness and across its surface due to the fiber recipe characteristics and/or the formation process without being considered non-workable. Further, a high loft fiber composition best suited for cushioning and bedding material is able to have different characteristics than that used in the formation of a suitable filter for paint arresting as there is not the level of concern for consistency and surface integrity. Also convoluting non-woven (particularly high loft non-woven material) also presents the additional problem of inconsistent surface cutting results and/or a change in the media characteristics at the cut surface (e.g., a fraying of fiber ends or tearing of surface sections). Also, for many filter uses, it is preferable to have a convoluter that utilizes a non-heated material cutting device as, while a heated cutter can avoid some of the issues of tearing and fraying, for many fiber batt compositions it would alter the initial fluid impact surface of the filter and lessen the penetration potential of the filter and hence its holding capacity, etc.

While non-woven batting is relatively inexpensive and thus good for disposable use, it is prone to poor surface projection integrity (e.g., peak integrity). Attempts by the inventors to convolute fiber blends has resulted in peaks which were torn more than cut in the convoluting process. The peaks were also very fragile with loose fibers hanging or laying on top of the peaks. Also, subsequent handling of the convoluted high loft non-woven product resulted in further degradation of the projections or peaks. Loose fibers are deemed problematic when the filter is intended for use as a paint filter. This is because loose fibers introduce the potential for fibers to find their way into the booth and on the object being painted.

In addition, while convoluting foam material in a production setting is relatively straightforward due to the material involved (e.g., polyurethane foam), the processing of convoluted fiber in a production setting directed at filter usage is much more difficult in view of the different characteristics of the material involved, the interplay of that material with a convoluter equipment, and the end production characteristics required. For example, the inventors efforts involved in convoluting high loft, non-woven filter material has shown that high-loft recipes and surface patterns play a role in the resultant filter characteristics.

For example, an improper fiber recipe (fiber blend or mixture and/or fiber bonding means utilized) and/or an improper cutting technique and/or an improper surface pattern can lead to problems such as ill-defined pattern generation both within a single convoluted piece as well as between convolution runs for what is considered the same starting material. Additionally, inventor testing has determined that, in addition to fiber blend recipes playing a role in whether a convoluted end product is suitable for an end use in, for example, a paint spray booth application, the surface pattern itself can play a role both in removal efficiency and in product acceptability. That is, the nature of high loft, non-woven material is such that during, for example, a peak/valley convolution processing, there resulted in many inconsistencies relative to peak height, base thickness, peak definition, peak and base height ratios, etc.

SUMMARY OF THE INVENTION

The subject matter of the present invention is inclusive of a non-woven media that provides good filtering characteristics (e.g., higher air flow, less pressure drop, good holding capacity and a longer period of time of use), particularly in the field of particle (e.g., liquid paint particle) filtering. The subject matter of the present invention is also directed at convolution techniques for convoluting non-woven filter media (e.g., high-loft) with good usage and handling characteristics. The inventors have determined that with proper fiber blend and density selections the "crispness" or clarity of the contoured cut as well as the durability of the final product can be improved. A rotating blade loop cut is preferred although, in certain settings, other surface contouring means are featured under the subject matter of the present invention inclusive of other blade based forms of separation facilitation means (e.g., a reciprocating non-loop blade or sheet blade), as well as alternate separation facilitation means as in a heated cut wire technique, as well as alternate overall filter formation techniques as in filter molding techniques, etc.

This fiber blend, density selection and/or fiber bonding means can promote high performance under the present invention relative to particulate removal efficiency, holding capacity, and pressure drop. In other words, the present inventive subject matter is inclusive of a filter that can be effectively produced via a convoluting method while providing a filter product with a proper pattern, blend, surface integrity, weight and thickness as to provide a highly efficient filter that is commercially viable for many filter uses including those filter usages having a high particulate throughput and/or high sensitivity to contaminant potential.

The inventors have further determined that fiber blend is highly influential with respect to paint filtration capability. Finer deniers (e.g., those at or less than 6 denier) in a blend capture smaller particles and usually exhibit higher filtration efficiencies. The term "denier" is a unit of weight for measuring the fineness of threads or strands of, for example, silk, rayon, nylon, etc. While not intended to be limiting relative to the present application, the term denier is often defined in the traditional sense as: weight in grams/9000 m for a single strand or filament. Thus, for a 15 denier fiber a single 9000 m length strand would weigh 15 g. The downside is that the finer deniers create a filter with a higher pressure drop reducing air-flow. Filters utilizing finer deniers typically "load-up" with paint faster reducing the life span of the filter. For a commercial operator of paint booths, extending the length of time between filter changes saves money in filter costs and increases the time efficiency of booth utilization. Thus, moving to a higher denier blend allows the filter to capture more paint before restricting airflow. However, the converse of the first example is true for the coarser denier filters. The courser denier filters are more apt to exhibit lower filtration efficiencies (allowing more particles to flow through the filter). More particles downstream of these filters will decrease the life span of traditional higher efficiency filters if utilized downstream in the system. If downstream filters are not used, then excess particles passing through the filter could collect inside ductwork or even passthrough to ambient air causing obvious problems.

When using coarser deniers, it has been found that increasing the weight or mass and the thickness of the filter generated acceptable filtration efficiency while keeping the advantage of higher paint holding capacities. The current blend embodiments of the present invention allow for good efficiencies and excellent paint holding capacities.

The fiber blend or recipe is also influential in facilitating consistent and repeatable convoluting of the fiber substrate. The current blend embodiments of the present invention also have been developed (along with the above considerations) to facilitate a finished product with defined convoluted peaks. In other words, it has been determined that a proper blend allows definitive peak shape formation and also allow good peak and surface integrity.

There is further avoided with the inventive blends of the present invention loose fiber release into the paint area or downstream. Any loose or separable fiber material that can find its way back toward the product subject to a paint or application process can lead to problems. For example, loose fibers can be particularly problematic in a paint booth application due to the chance of the fibers becoming entrapped on a freshly painted surface. Also, a preferred technique of cutting the fibers is a mechanically driven blade as opposed to a heated resistance wire as contact cut heating, while lessening the potential for loose fibers, can alter the filtering characteristics in the cut surface region and thus is a less preferable cutting technique under the present invention.

The subject matter of the present invention includes a fiber based filter (e.g., a high loft, non-woven fiber based filter is preferred) which, by way of an appropriate configuration and structure composition (e.g., fiber recipe) provides a fiber filter batt that can be convoluted while avoiding problems associated with the prior art (e.g., lack of consistency in the structure of the resultant filter such as poor structural surface presentation from filter to filter produced and the avoidance of torn or poorly defined surface contouring which could, if present, lead to the above described problem of filter material generated contamination).

The convolution process can produce two (or more as with a multi-blade arrangement) fiber filter sheets per single fiber batt fed into the convoluter. Under the present invention, there is achieved consistency of the finished convoluted fiber filter sheets, both with respect to the mirror image pair of convolutions from a single source fiber batt (e.g., good mirror image consistency of the two sides, top and bottom derived from a fiber batt) and from common type fiber batt to common type fiber batt produced by the fiber batt production assembly (e.g., consistent and even density levels through the thickness and along the length of each filter sheet produced from a common type fiber batt). This consistency is derived to some extent on the recipe utilized with its fiber types, deniers and binding characteristics (relative to batts designed to have the same general composition and structure as variations from batt to batt are also possible with adjustments in the non-woven batt forming means or batt forming assembly of the present invention). The fiber filter sheets produced in the convolution process can form a resultant filter directly off the convoluter or the sheets can be further processed as in cutting with a cutter to form smaller sections from the sheets meeting the desired resultant filter size (e.g. a vertical cutting blade moving relative to a horizontally conveyed fiber filter sheet).

In order to improve the performance of the blend for paint arrestance, the majority of the fibers in the blend is preferably in the coarse denier fiber category. For the purpose of this present discussion, coarse denier fibers are about 15 denier and higher. Also, preferably the majority of the fibers are in the 40 denier range. The coarser denier fibers are considered under the present invention to enable better paint/air separation and paint holding capacity. Also, the coarser fibers are considered under the present invention to enable the filter to maintain a higher air-flow, less pressure drop, for a longer period of time during use.

A preferred embodiment of the present invention also features relatively high depth in the filter surface contouring as in relatively high height in convolution formed peaks relative to the base (with "high" being for example greater than 50% of the total height of the resultant filter). A preferred "high" height embodiment is also preferably one with a height of 75% or more of the total height of the resultant filter with a range of about 50 to 85% being well suited for many applications of the present invention. After 75% the thinness of the base can present some problems relative to, for example, integrity and handling. Thus, a range of 50 to 75% peak height depth represents a preferred more universal approach. It is considered that with the higher depth of the valleys between projections, preferably also with relatively larger (e.g., equal to or greater than 2.0 inch) peak spacing, the filter exhibits a higher paint holding capacity even beyond that provided with the shallower depth arrangement produced under the techniques of the present invention. For example, in a first embodiment of the invention there is a pattern having small height peaks (with "small" being, for example, equal to or less than 50% of the total height of the filter and a lesser distance between the peaks (e.g., less than 1.125 inches) relative to the above noted more preferred embodiment having high peaks and deeper valleys and relatively large peak spacing from row to row (e.g., 2.0±50 or more inch peak spacing). While even the "shallower" arrangement is considered to represent an improvement over the prior art, it is considered that by using a larger pattern, wider base and more distance between peaks, there is achievable a further improvement in consistent filter processing.

Experimental findings indicate a preferred embodiment is one that has a maximum feasible depth of cut that is achievable under the techniques utilized by the present invention (e.g., a convoluter such as that described herein) at the minimal peak spacing, which provides maximum filtration surface area. In addition to the increased filtration surface area achieved, a preferred embodiment also allows a more robust and rigid peak compared to designs that incorporate shorter peak to peak spacing under the techniques utilized by the present invention.

Furthermore, it is considered by the inventors that by using the coarser denier fibers along with a higher percentage of binder fiber (e.g., a percentage of core and/or solid binder fibers representing at least 15% of the overall weight of the fiber mix used in the production of the fiber batt), the convolute pattern becomes even more greatly defined with no apparent peak deformation and/or loose fibers at the peaks. As noted above, loose fibers at the peaks would be problematic in a paint booth application due to the chance of the fibers becoming entrapped on a freshly painted surface.

In addition, processing of convoluted fiber consistently in a production setting is difficult. Of particular difficulty is avoiding in a convolution process a poorly defined pattern or loose fibers at the peaks which, if present would render the filters not commercially acceptable for uses preferred under the present invention. As well, the ability to control the consistency of the final product with respect to peak height, base thickness, peak definition, etc. is difficult in many production settings. Inconsistent peak and base height ratios will affect the test results and subsequent performance in a real world application. This can further lead to a high (e.g., 50%) final product scrap rate. Under preferred embodiments of the present invention, however, through a proper pattern, proper processing technique, and proper blend, weight, and thickness of the filter (and associated fiber sheet under a preferred convolution process) there is considered by the inventors to be provided a highly advantageous filter that is further considered commercially viable.

There is featured under the subject matter of the present invention a method of producing a filter comprising providing a non-woven fiber batt and convoluting the non-woven fiber batt to produce a fiber filter sheet having a convoluted flow contact surface. Also, preferably the step of convoluting includes feeding the fiber batt between a pair of rotating tooling members and splitting the fiber batt into at least two fiber filter sheets with respective convoluted flow contact surfaces. Further, the tooling members preferably include projections which result in peak and valley surface contouring in the fiber filter sheets with the peaks representing 50% or more of total thickness of the fiber filter sheet. Also, in a preferred embodiment the peak and valley surface contouring includes sinusoidal or zig-zag shaped elongated ridges as peaks in the peak and valley surface contouring, and wherein the total fiber sheet thickness is 1 to 4 inches and rows of peaks that are spaced apart for 2.0±0.75 inches.

Under a preferred method a fiber filter sheet is produced from a non-woven fiber batt that has a base (or basis) weight of between 600 g/sqm to 2100 g/sqm with a thickness of 75 to 165 mm. Also, the non-woven fiber batt preferably has a base weight of between 1200 g/sqm to 1800 g/sqm with a thickness of 100 to 150 mm, and is comprised of a first set of fibers of 15 denier or greater such as non-binder type fibers that are mixed with a thermal binder fiber type. A preferred method further includes convoluting a high loft fiber blend comprised of a first set of fibers representing a majority of fibers in the non-woven fiber batt and which first set has an average denier of 40 denier or greater.

An embodiment of the present invention further includes convoluting a high loft fiber batt that is comprised of a first set of fibers having a denier value of 15 to 40 denier, a second set of fibers having a denier value of 40 to 100 denier and a thermal binder fiber. For example, the first set of fibers can represent about 20 to 50% by weight of an overall fiber blend forming the non-woven fiber batt, the second set of fibers can represent about 30 to 75%, and the thermal binder fiber can represent about 20 to 40%. In a preferred embodiment the first set of fibers represent about 10 to 25% by weight of an overall fiber blend forming the non-woven fiber batt, the second set of fibers represent about 40 to 60%, and the thermal binder fiber represents about 25 to 35%, and wherein each of the first and second sets of fibers and the binder fibers represent different binder fibers. Also the fiber batt being convoluted is preferably comprised of a high loft non-woven fiber batt with a density level of 7.5 $Kg/m^3$ to 15.0 $Kg/m^3$.

As an additional example of an embodiment of the present invention, the non-woven fiber batt is convoluted to form a high loft fiber filter comprised of a majority of coarse fibers and the fiber filter further comprises thermal binding fibers and wherein the majority of coarse fibers of the non-binder type fibers have an average denier of about 40 or more. The fiber batt is preferably split into two fiber filter sheets with the fiber batt thickness being from 1 to 9 inches. Also, as shown, an interface region between each projection and supporting base is formed of a continuous blend of the fibers of said fiber blend.

Further, a preferred method under the present invention includes a convoluter that produces a plurality of fiber filter sheets with each filter fiber sheet being monolithic and having projections and valleys and a base layer below the projections wherein the projections extend for 50% or more of the total fiber filter sheet thickness, and wherein the projections define a plurality of rows of sinusoidal or zig-zag shaped projections which are spaced by 2±0.75 inches from row to row and have peak to peak amplitude spacing along a row of about 2 inches or more and wherein the slope angle is from 40 to 65 degrees. For example, an embodiment of the invention includes a convoluter that produces a plurality of fiber filter sheets with each filter fiber sheet being monolithic and having projections and valleys and a base layer below the projections wherein the projections extend for 50% or more of the total fiber filter sheet thickness, and wherein the projections define a plurality of rows of peaks having a side slope of 45 to 60°

An additional embodiment of the invention features a filter comprising a fiber filter body having a base and a plurality of projections extending from the base, and wherein the fiber filter body is a monolithic high loft fiber material body that is comprised of a fiber blend having a majority of fibers of or averaging 15 denier or higher and a thermal binder representing 15% or higher by weight of the fiber blend. For example, an embodiment features a fiber filter body that comprises a fiber blend having a first set of fibers with a denier value of 15 to 40 denier, a second set of fibers having a denier value of 40 to 100 denier and a thermal binder fiber, and wherein the first set of fibers represent about 20 to 50% of an overall fiber blend forming the fiber filter body, the second set of fibers represent about 30 to 75%, and the thermal binder fiber represents about 20 to 40%. Also, the fiber filter body preferably has a base weight of between 600 g/sqm to 900 g/sqm with a thickness of 50 to 75 mm and the projections extend for 50% or more of a total thickness of the fiber body and are in the form of sinusoidal or zig-zag shaped rows having a slope angle of 40 to 60 degrees, as in one with projection rows that are spaced apart by 2±0.75 inches and said projections represent about 60 to 85% of the height of said fiber filter sheet and said projections are rounded peak rows with a side wall slope of 45 to 60°.

A filter such as that described when functioning as a paint arrestor filter can provide a paint holding capacity of 6.8 pounds or more per 20 inch by 20 inch area of the paint arrestor filter before reaching about 0.50 pressure drop across the filter.

An embodiment of the present invention further comprises a filter formed of a monolithic, high loft fiber filter body having a majority of non-binder fibers of 15 denier or more and being bound by a thermal binder representing 15% or more of the total fiber weight of the high loft fiber body, and the high loft fiber body having a basis weight of 600 to 900 g/sqm (as produced for example from the splitting of a fiber batt having 1200 to 1800 g/sqm) and a thickness of 1 to 4 inches, and the fiber body comprising a base layer and a plurality of projections extending off the base layer and the projections being arranged to define valleys therebetween. The filter is also preferably formed with a majority of the non-binder fibers that are of 40 denier or higher as in a filter with non-binder fibers bonded in a fiber blend by thermal binder fibers, which thermal binder fibers representing about 20 to 40% by weight of the fiber blend and with the fiber filter sheet having projections comprised of continuous rows of peaks and with those projections preferably representing about 60 to 85% of the height of the fiber filter sheet and the projections are rounded peak rows with a side wall slope of 45 to 60°.

There is further featured under the subject matter of the present invention paint arrestor booth comprising an enclosure, one or more of the filters such as those described above and a support for the one or more filters positioned within the enclosure. There is further provided an air flow generator arranged for passing air through the supported filters either by a behind the operator forcing forward of air and/or a drawing of air via a downstream fan or the like. Additionally featured is a method of removing particles as in paint particles by passing a stream of fluid containing particles to be removed through an embodiment of the filter of the present invention and assembly a spray booth which includes an encompassing housing structure with a support structure contained in the housing and one or more embodiment of the filter of the present invention contained on the support coupled with fluid flow means for directing fluid through the housing and past the filter(s).

DETAILED DESCRIPTION OF EXEMPLARY EMBODIMENTS OF THE INVENTION

Figure 1:
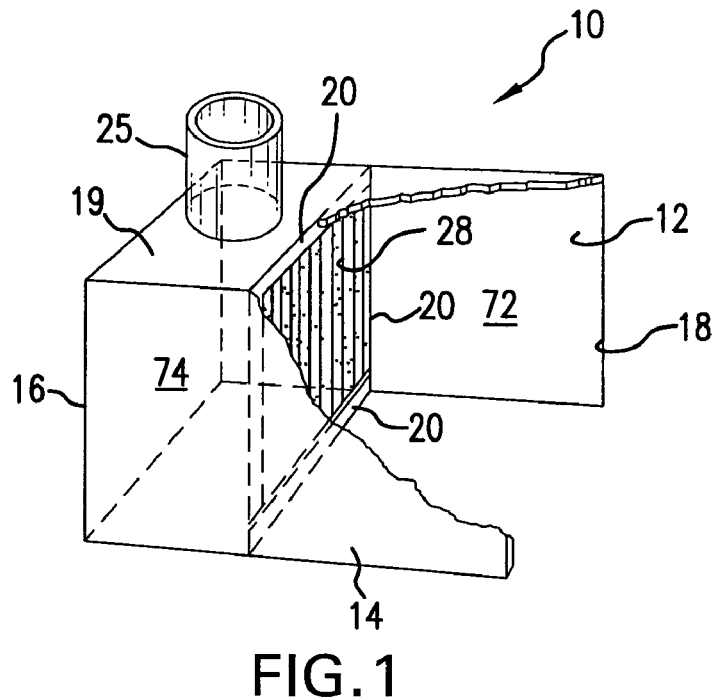
FIG. 1 is a schematic perspective view, partially cutaway, of a paint spray booth capable of utilizing a paint spray filter incorporating subject matter of the invention.
Figure 1A:
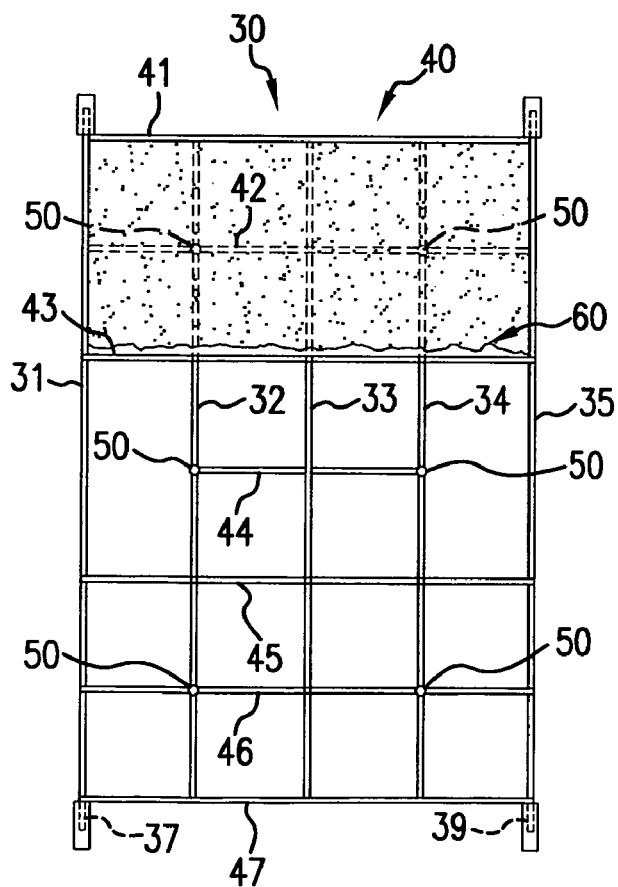
FIG. 1A is a schematic front view, partially cutaway, of a non-convoluted paint spray filter "Sample 1" supported by a conventional paint arrester filter support structure.
Figure 1B:
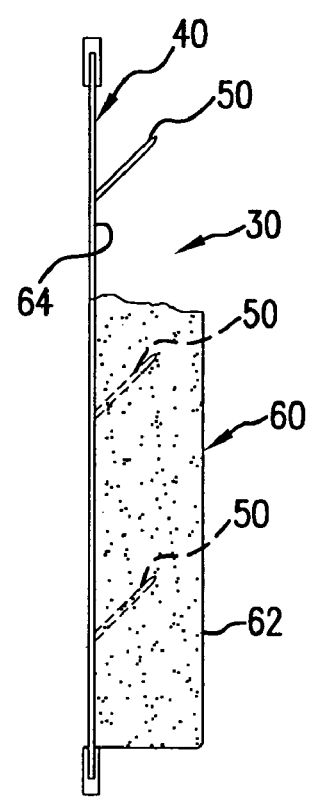
FIG. 1B is a schematic side view, partially cutaway, of the paint spray filter shown in FIG. 1A.

As explained above, this invention contemplates providing an improved fluid flow filter for use in, for example, a paint spray booth. An exemplary embodiment of a conventional paint spray booth with filter support structure is shown in FIGS. 1, 1A and 1B, and is identified by reference numeral 10. Paint spray booth 10 includes a pair of side panels 12, 14 and end panel 16, and means defining an access 18 to booth 10 from the front thereof. Intermediate end panel 16 and access 18 are frame members 20. Frame members 20 like that featured in FIG. 1 typically define one or more rectangular frameworks 30 having dimensions of approximately 36 inches high and varying widths, for example, 24 inches wide. Thus, depending on the size of booth 10, one or more frameworks comprising frame members 20 will be utilized. For example, if booth 10 is only about three feet high by two-feet wide, only one framework 30 will be needed; on the other hand, if booth 10 is to be six feet high by four feet wide, two frameworks (two columns three feet high by four feet wide) will be needed, etc. Frame members 30 can take any desirable shape.

The frame members 30 used in the construction of booth 10 are used to support a paint spray filter, such as an filter 28 shown in FIG. 1. Still referring to FIG. 1, paint spray booth 10 is shown to be divided by filter 28 into a spraying area 72 and an exhaust area 74. An article to be sprayed (not shown) is typically placed in spraying area 72 where it is spray painted by an operator in accordance with usual spray painting operations. Fumes and particulate matter associated with the spraying process are ordinarily exhausted by ventilation means 25 communicating with the top 19 of booth 10 to pull the polluted air away from the operator of the paint spray apparatus in a well known manner.

Reference is now made to FIGS. 1A and 1B which illustrate the paint spray filter 28 and framework 30 combination shown in FIG. 1. Paint spray filter 28 is supported on paint arrestor support structure wire grid 40. The filter support means 40 is shown as having a plurality of horizontal numbers 41 through 47 and a plurality of vertical members 31 through 35. Horizontal members 41 and 47 define the horizontal edges of grid 40 and vertical members 31 and 35 define the vertical edges of grid 40. Thus, horizontal members 41 to 47 and vertical members 31 to 35 define the perimeter of the grid which extends substantially 36 inches in the vertical direction and 24 inches in the horizontal direction in the illustrated embodiment.

Grid 40 further includes a plurality of attachment spikes 50. In this preferred embodiment six attachments spikes 50 are utilized. The six attachment spikes 50 are located, respectively, at the intersections of horizontal members and vertical members.

Figure 3:
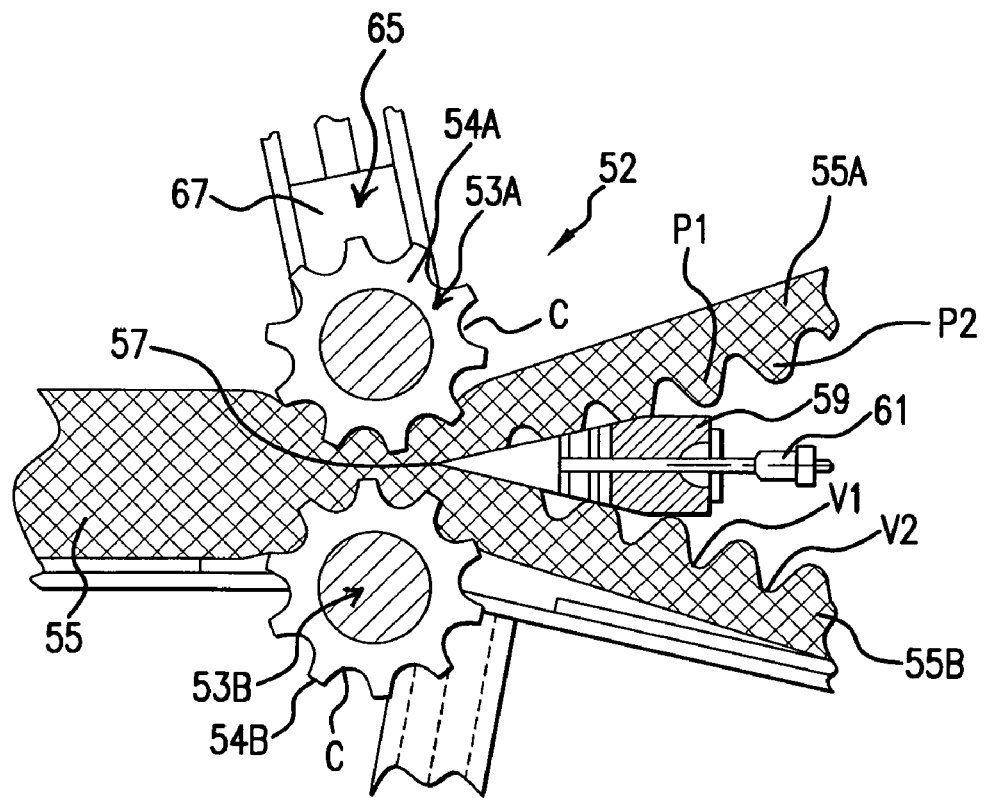
FIG. 3 is a cut-away front elevational view of the convoluter assembly in FIG. 2 showing a fiber batt being convoluted into two fiber filter sheets.

Spikes 50 serve as attachment means for holding filter sheet 28 onto grid 40. As shown in FIG. 3, filter 28 is shown as being a sheet of filter material 60 having planar front and back surfaces 62,64 (a fiber or a foam sheet being illustrative of the prior art filters). Filter 28 is shown generally coextensive with the portion of grid 40 defined by horizontal members 41 and 47 and vertical members 31 and 35. The sheet of filter material 60 is attached to grid 40 by pushing rear face 64 onto spikes 50 until rear face 64 is substantially flush against grid 40, particularly horizontal members 41 through 47 and vertical members 31 through 35. In this manner, rear face 64 of the sheet of filter material 60 substantially covers grid 40 while front face 62 of the sheet of filter material 60 is fully exposed.

The above described spray booth and filter support frame structure are but one of many types of ventilating enclosure means and filter support means for which the filter of the present invention can by utilized as there are a wide variety of ventilating enclosure and filter support means suitable for use with a filter falling within the subject matter of the present invention (and thus FIGS. 1, 1A and 1B are provided for illustration background purposes only).

As will become more apparent below, providing a proper pattern, proper blend, weight and thickness to a fiber sheet, and preferably also a proper convoluting processing of the pre-convolute fiber batt provides for a highly efficient filter product which is commercially viable for a wide variety of industrial usages including those with large throughput (e.g., a paint arrestor filter which is illustrative of a filter with a frequent replacement requirement (e.g., an each day filter replacement environment)). The present invention thus provides for a relatively inexpensive filter material that still can provide good results in the three categories of i) particulate removal efficiency, ii) holding capacity and iii) pressure drop levels while also avoiding problems of fiber contamination and problems associated with production consistency and quality goals.

Fiber Batt Blend, Weight and Thickness

Providing a proper pattern, proper blend, weight and thickness to a filter of the present invention is facilitated with the formation of a non-woven fiber batt having characteristics that provide for such a filter formation. The filter of the present inventions is preferably generated from a high-loft, non-woven fiber batt. In its preferred usage in the present application, the term "highloft" is in reference to (i) lofty, relatively low density nonwoven fiber structures, preferably having a greater volume of air than fiber; (ii) nonwoven materials that are produced with the purpose of building loft or thickness without increasing weight; and/or (iii) nonwoven fiber products that are not densified or purposely compressed over a significant portion of the product in the manufacturing process of the fiber batt or filter formation starting material.

The highloft nonwoven material of the fiber batt of the present invention preferably has a basis weight of 600 to 2100 $g/m^2$, more preferably 1200 to 1800 $g/m^2$. The highloft nonwoven material of the present invention also preferably has a pre-convolution thickness falling between within a range of 40 mm to 225 mm with a thickness range of 100 to 150 mm being deemed well suited for many uses of the present invention. With this range of thickness for the fiber batt, when using a convolution process to generate a desired three dimensional surface(s) in the resultant filter, the convolution process is arranged (e.g., roller spacing and compression levels) to achieve a preferred height in each mirror image fiber filter sheet that ranges from 1.5 to 4.0 inches and more preferably 1.75 to 3.0 inches (which range generally holds true as well for the resultant filter as any post processing of the filter sheet preferably involves no additional extensive compression) and more preferable about 2 inches. Once the fiber batt has sufficiently "set" for convolution in the convoluter and there a considered a minimal (e.g., non-significant and/or non-noticeable) loss in height due to convoluter compression between original fiber batt and resultant mirror image fiber filter sheets for preferred embodiments of the invention.

As having too low a basis weight for a given thickness at the higher end of the above thicknesses could degrade the filtering effect in some instances, it is desirable for some applications to use the lower end basis weight values in conjunction with lower end thickness ranges while the higher end basis weight are generally not subject to the same concerns. Accordingly, a basis weight of 600 $g/m^2$ with a pre-convolution loft or thickness range of 40 mm to 65 mm, or 900 $g/m^2$ with a pre-convolution loft or thickness range of 40 to 100 mm, or 1200 $g/m^2$ with a loft or thickness range of 50 mm to 140 mm, or 1500 $g/m^2$ with a loft or thickness range of 75 mm to 165 mm, or 1800 $g/m^2$ with a loft or thickness range of 90 mm to 190 mm represent preferred basis weight/thickness combinations under the present invention. More preferable combinations include, for example, a basis weight 900 $g/m^2$ (with a preferred thickness or loft range of 75 mm to 100 mm)

to 1500 g/m² (with a preferred thickness or loft range of 125 mm to 165 mm). Additional preferred combinations deemed well suited for many intended uses of the present application include weight/thickness combinations of 1800 g/m² (with a preferred thickness or loft range of 125 mm to 190 mm) to 2100 g/m² (with a preferred thickness or loft range of 175 mm to 225 mm). The foregoing thickness ranges show preferred ranges relative to the noted basis weights that are well suited for typical intended usages of the present invention, but thickness levels above and below the noted ranges are also possible relative to the noted basis weights and vice versa depending of the desired filter requirements and intended usage.

Thus, in accordance with the present invention a highloft density level of 8 Kg/m³ to 24 Kg/m³ or, more preferably 7.5 Kg/m³ to 15 Kg/m³, (and even more preferably, 9 Kg/m³ to 12 Kg/m³) is well suited for the filtering purposes of the present invention. The above-noted high loft density valves are relative to a pre-convolution state of the fiber batt or in other words the condition of the fiber layer before being compressed and cut during the convolution process (although as noted above for preferred embodiments of the invention there is deemed a negligible difference between the two states upon rebound).

The preferred denier values of the fibers used in the non-woven fiber blend of the present invention preferably are 15 denier or more, more preferably 25 denier or more, with 25 to 100 being a preferred range. Also, a 30 to 50 denier value as in a 40 denier, is preferred as the majority percentage of blend. For example, in a preferred filter, a majority blend of 40 denier is considered most desirable although using higher deniers is included within the scope of the invention, but efficiencies will fall. Likewise using lower deniers is possible under the present invention but will cause the filter to load prematurely for many intended uses. Blends of fibers using 15 denier through 100 denier are featured under the present invention. As an example, a blend of 15 and 100 deniers can render similar results of an all 40 denier blend (e.g. an averaging providing about a 40 denier average). However, an all about 40 denier blend is preferable to a mix and matching of many different denier types to achieve the average (although the present invention subject matter is inclusive of such a mixing of different deniers in an effort to achieve a desired denier value average for a majority of the blend, for example). For example, from the standpoint of ease of blending and processing use of a mostly 40 denier blend is the preferred technique. An additional example, includes a blend of fibers with no 15 denier but only 40 denier or higher together with a percentage of binder fiber.

The non-mechanical high loft bonding (or means for bonding the fiber blend) utilized in the present invention is helpful in providing the desired filtering characteristics, which facilitates the achieving of the high efficiency filter product described above and below. While thermal and/or spray resin bonding represent the preferred binding technique or binding means utilized in the present invention (e.g., such techniques help in maintaining the desired highloft attributes), combinations or sub-combinations or individual binding techniques such as mechanical, thermal and/or chemical bonding techniques may be relied upon as the means for binding the fibers to provide the fiber batt. As an additional example of a combination of techniques which retains the desired highloft attributes, mechanical bonding equipment may be used in conjunction with other non-mechanical bonding techniques to provide various finished batts. For example, one side (e.g., top or bottom) of the material can be made of higher density using mechanical techniques while the other side remains lofty. This creates various airflow properties. However, having a constant density throughout the fiber batt is preferred. The loft values provided herein can thus be considered to represent the value of the non-mechanically bonded portion or area of the highloft material when other than a consistent density fiber batt filter is to be produced.

If mechanical bonding is used in conjunction with one or more of the above noted non-mechanical bonding techniques, it is preferably used only in a minor context such as only affecting a small percentage of the overall portion (volume or area) of the filter (e.g. less than 10%). Also, if mechanical bonding techniques are employed over a larger area of the material, a minor degree of bonding by mechanical means is preferred to essentially preserve initial loft and density values (e.g., a resultant loft or thickness value that is within 20% of one that is entirely free of the finished goods mechanical bonding supplementation). As an example, mechanical bonding can be provided at the edging of the filter sheet to facilitate resultant filter attachment to a periphery based support structure.

In chemical bonding, a resin or adhesive, typically in latex form, is sprayed on the carded web and then dried and/or cured to bind the fibers together in their current orientation. The substance sprayed acts as a "glue" holding the fibers together and producing bond points at the intersection or the point where two or more fibers are in contact. Saturation bonding is similar except the web is immersed into a bath of resin instead of the spray application of the resin. While the spray application and saturation through immersion are possible techniques under the present invention, they are less preferable than the below described thermal bonding means such as a thermal bonding with the use of binder fibers. The chemical binder method involving a spray application has environmental issues that also contribute to the saturation method not being the preferred method of binding for many applications and also issues of reaching the interior with binding chemical. For example, the thickness of the preferably sized non-woven batts do not lend themselves well for chemical bonding spray or immersion. Spray bonding batts of these thicknesses can result in heavy applications of resin on the surface and virtually none in the center. Also, the softer center may not convolute well. Saturate bonding can also affect the final loft of the non-woven batt before convoluting and thus is less preferable due to such compression issues. As noted, however, the present invention also includes, within its scope, these techniques as well as hybrid combinations of, for example, thermal and chemical bonding in alternate, less preferred, embodiments.

Thermal bonding utilizes binder fiber that upon heating provides the binding means amongst the fibers in the fiber recipe utilized. This can include binder fibers binding together as well as non-binding fibers being bound together directly or indirectly by way of a binder fiber in the recipe. A recipe have binder fiber (e.g., from 15 to 50% of the overall weight of fibers utilized in a recipe is preferred) represents the preferred binding means under the present invention. Binder fiber is typically composed of polymer(s) that have a lower melting point than the "fill" fibers (if utilized) or other fibers in the blend (if utilized—as an all binder fiber embodiment is featured as an alternate embodiment under the present invention). The binder fiber then melts in the presence of heat in a subsequent processing step. The binder, in molten form in the presence of heat, flows to the intersection of fibers and upon cooling re-hardens and forms a bond. These bonds allow the fibers to remain in their current orientation. Binder fiber can be a solid, single polymer fiber with a significant lower melting point than the fill fibers in the blend. The binder can also be a sheath/core fiber whereas the sheath component is a polymer of low melting point with the core being a polymer of a relatively higher melting point. A core binder fiber as the binding fiber is preferred under the present invention.

These thermal/adhesive bonding techniques produce finished materials with significantly higher loft or thicknesses for the same basis weight than mechanical bonding means.

The thickness and loft of the product is beneficial in the preferred usage of the present invention. In a preferred embodiment invention the fiber bonding means is provided by a binder fiber with the binder fiber preferably being 15% more of the overall fiber blend weight with 25% to 50% binder fiber percentage being preferred and with 25 to 35% being a more preferred range for many applications. Binder fiber (e.g., commercial sheath/core variety) denier range includes, for example, 2 denier to 15 denier with the preferred range being from 4 to 15 denier.

The high loft non-woven barrier material of the present invention can be manufactured in a variety of ways some of which are described in the "Non-Woven Textile Fabrics" section in the Kirk-Othmer "Encyclopedia of Chemical Technology" $3^{rd}$ Ed. Vol. 16 pgs 72-124, which section is incorporated herein by reference. A preferred manufacturing process for forming the barrier of the present involves passing supplied fiber mass from a compressed bale by way of a feed device, such as a feed conveyor or rolls, to an opener designed to break apart the fiber mass, thus initiating fiber opening and separation, passing opened fiber mass to a weigh device, continuous or batch, designed to weigh the opened fiber mass, blending weighed amounts of the desired amount of opened fiber mass in a blender to achieve a homogeneous blend of the desired amounts of the opened fiber material. The manufacturing process further includes passing the opened, weighed and blended fiber mass to a non-woven forming device such as a carding device to form a web of non-woven material. Preferably the process involves cross lapping or layering webs in a cross lapping device of the like until the desired thickness of predetermined basis weight non-woven highloft material is obtained.

Preferably each of the above relied upon stages is controlled and coordinated through use of a central processor in communication with the various pieces of "equipment in the overall system." This allows, for example, an operator to input a desired blend recipe having the above noted desired percentage by weight amounts of the desired categories of material to be used and to control the basis weight of the blended fiber and thickness (e.g., amount of cross-lapping webs) of the desired layer of non-woven highloft material. The opening and blending of the aforementioned fibers is preferably carried out with high quality fiber openers and blenders that are designed for accurately producing a homogeneous blend of the above described fibers. Suitable opening and blending equipment includes a bale opener and fine opener manufactured by "Fiber Controls" of Gastonia, N.C. and a blended fiber reserve feed chute manufactured by "Dilo Group" of Bremen, Germany. Opening is preferably carried out through the use of various stages of opening wherein each successive stage represents finer opening and more fiber separation to help in achieving a more homogeneous and accurate resultant blend. Following the various opening stages, all opened fiber components for use in the desired resultant blend are preferably weighed before blending to ensure accurate percentage of blend. This blending step can be achieved without weighing but poor blending can potentially negatively affect the performance of the filter of the present invention by allowing relative low concentrations of key components in an area of the material or too high "blocking" concentrations in other areas.

Blending involves, for example, mixing the weighed fibers through layering of the weighed components and feeding through a blending roll beater (which can be configured using pins or saw tooth wire) turning at a high rate of speed relative to the speed of the weighed components and transported into a chute feed or reserve feed hopper, such as the "Direct Feed" brand hopper sold by Dilo Group of Bremen, Germany. Further blending can be accomplished by processing the pre-blended components through a reserve blending mixing chamber such as the Type 99 Reserve Chamber sold by Fiber Controls, Inc. of Gastonia, N.C.

The opened and blended fibers are then preferably processed through a high quality non-woven carding device (e.g., a Type 1866 Highloft Non-woven Carding device sold by Dilo Group of Bremen, Germany) and the resulting web is crosslapped or layered (e.g., by way of a CL-4000 series crosslapper sold by Autefa, Germany) to form a highloft web. In a typical carding process there is utilized a series of wire wound rolls turning at various speeds (depending on the application and product to be carded) which can be controlled by the control processor. Most carding devices are comprised of a breaker section with a large main roller with smaller diameter rolls positioned around the arc of the main roller. A second, larger main roller is configured with a doffer roll between the breaker main and itself. A series of smaller rollers are configured around the second main roller. Two doffer rollers positioned over top one another in a vertical arrangement remove the carded web from the carding device. Various configurations of carding devices are available. Speeds of the rolls in a given carding devices are usually adjustable to allow for processing a wide range of fibers and deniers. In the carding device, the fiber is carded or combed by the action of the moving saw-tooth wire against the fiber mat being fed through the machine. This same process is accomplished through garneting and other various web forming machinery such as airlay webs. The web exiting the carding devices or web former can be used directly or can be crosslapped, vertically or horizontally, to build product loft or thickness and weight. Crosslapping layers or stacks of the continuous card web allows for the formation of non-woven material to various desired thicknesses and weights. The web, in one embodiment of the invention, incorporating binding fiber, is carried through a forced air, gas-fired continuous oven with temperatures up to 500° F. so that bonding of the web takes place. Bonding temperatures are dependent on the binder components in the blends. The material is then subjected to final processing such as having the material rolled on rolls and slit to width per application to provide a fiber batt to be received by the convolutor or alternate contoured three-dimensional surface forming means. The material can also be cut into panel size pieces depending on specific applications. For example, the output material, if not already in the desired shape and size, can be cut or otherwise altered to make it suitable for feeding into a convoluter, for convoluting fiber filter sheets in accordance with a preferred three dimensional surface forming means under the present invention.

The above described preferred "equipment assemblage" is capable of producing highloft nonwoven fiber blends with weights of 40 g/m² (with, for example, thickness range of 5 mm to 10 mm) through 1800 g/m² and higher (with, for example, a thickness or loft range of 150 mm to 250 mm and higher.)

Convolution/Surface Pattern

Figure 2:
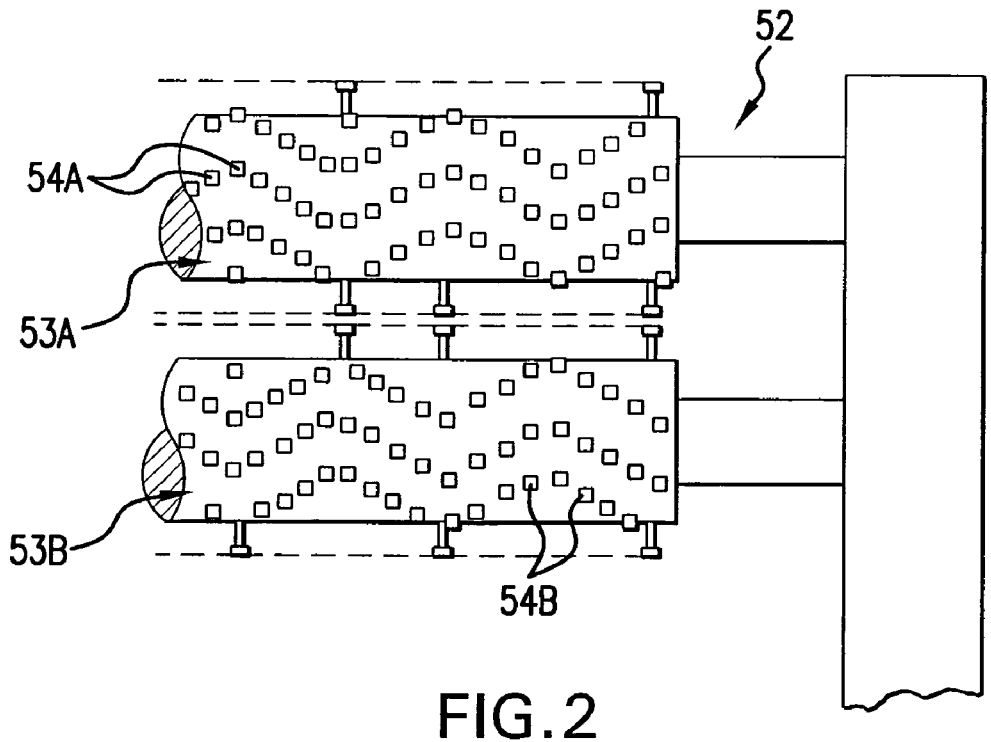
FIG. 2 is a side elevation view of a contouring assembly for imparting a three dimensional surface pattern in a fiber batt fed in the containing assembly

With reference to FIGS. 2 and 3, there is illustrated an example of a suitable convolution assembly 52 suited for convoluting fiber batt 55 to achieve a pair of the fiber sheets 55A and 55B from which the fiber filter of the present invention is produced. In the present application the following terminology is utilized to facilitate reference to different states of the filter material involved; with "fiber batt" preferably being the material produced by the high loft non-woven fiber layer formation equipment or means (e.g., cross lapping or layering webs in a cross lapping device or the like until the desired thickness of predetermined basis weight non-woven highloft described above). Thus, the fiber batt is the material to be fed to roller set 53 and subjected to the compressive tool die sets 54A and 54B provided on the respective rollers 53A and 53B. The individual projection members 54A and 54B of the respective tool die sets are preferably arranged to provide sufficient compression projections and reception cavities as to push portions of the fiber batt lying above the blade 57 plane below the blade plane and portions of the fiber batt lying below the blade plane above the blade plane as to generate a preferred peak and valley arrangement as in the peak and valley mirror image arrangement represented by fiber filter sheets 55A and 55B. As shown in FIG. 2, blade 57 is supported by a wedge shaped blade holder 59 with blade position adjustment means for movement of the blade forward or back along the plane (shown horizontal for this embodiment) occupied by the tip of blade 57.

Depending on the thickness of fiber batt 55, this can include a spacing between the rollers 53A and 53B leading to the tool projections (54A and 54B) being in an intermeshing arrangement where the tool projection of one roller extends into a cavity C formed between an adjacent pair of tool projections on the opposite roller. FIG. 3 further illustrates roller adjustment system 65 shown with a hydraulic member 67 used for adjusting the relative spacing between the opposite roller's outer circumference. With the above-described preferred thickness range (e.g., 1.0 to 9.0 inches) in the fiber batt being fed to the convoluting roller set, the minimum preferred spacing between the outermost circumference represented by the outer end of the tool projections for each roll ranges from plus 0.375 inches to plus 0.125 inches with "plus" being indicative of a spacing between respective circumferences represented by the tips of respective projections in the tool set on the rollers as opposed to a minus having intermeshing tool sets which is a suitable set up for some embodiments but not preferred.

The term "fiber filter sheets" is thus representative of the output of the convolution equipment which is preferably in the form of a mirror image pair. The term "filter" by itself is used below in reference to the resultant filter(s) derived from the fiber filter sheets, which filters are in a ready for use state (e.g., cut up squares of a fiber filter sheet or the end use filter can be one in the same as the fiber filter sheet structure when the filter framework structure is suited for supporting such a fiber filter sheet without further modification in the sheet and/or the convoluter output provides ready for immediate filter use fiber filter sheets).

The present invention preferably features convolution equipment that provides the capability of high throughput in the manufacture of fiber sheets as in sheets being generated at a rate of 150 ft./min. line feet in the longitudinal feed direction, and with a fiber filter sheet width (transverse to feed direction) of about 36 to 80 inches being illustrative and with the feed length being preferably sheets of 100 inches or a feed provided from an even greater length roll as in, for example, up to a 50 foot roll. The width is preferably generally equal to the infeed of the fiber batt although subsequent width processing is also featured under the present invention. The filters can also be sized for insertion within a support frame such as that utilized in the spray booth illustrated in FIG. 1 of the present application.

After the fiber batt is convoluted to generate opposing fiber filter sheets, the fiber filter sheets are separated and then, if applicable to the desired embodiment, subjected to a filter formation process (e.g., a cutting operation for the desized end use size) or, depending on the end usage envisioned, a complete fiber filter sheet can be relied upon.

As also seen from FIG. 3 the projection peaks P1, P2 . . . etc., in one fiber filter sheet correspond with the valleys V1, V2 . . . etc., in the opposite layer, although upon separation and proper orientation two essentially mirror image fiber sheets are provided.

While the illustrated convoluter assembly of FIG. 3 illustrates a preferred convoluting assembly, other three dimensional surface forming means are featured under the present invention including alternate convolution means such as conveyor belts functioning as rollers (a roller/conveyor belt combination of opposite positioned conveyors) as well as a sliding plate arrangement (a pair of sliding and/or one stationary plates) or a sliding or stationary plate used in conjunction with a conveyer belt or individual roller, or the like or alternate contoured surface forming means as in grinding or cutting (mechanical as in a fixed blade with moving substrate or non-mechanical application as in a laser) and the like. Also, as will become more apparent below, the recipe of the fiber batt under the present invention is also suited for use in other three dimensional contoured surface forming means as in a molding or calendar process, but one of the benefits of the present invention is to have a fiber batt that is well suited for use with a convolution means for efficiency, easy operation, etc.

Figure 4:
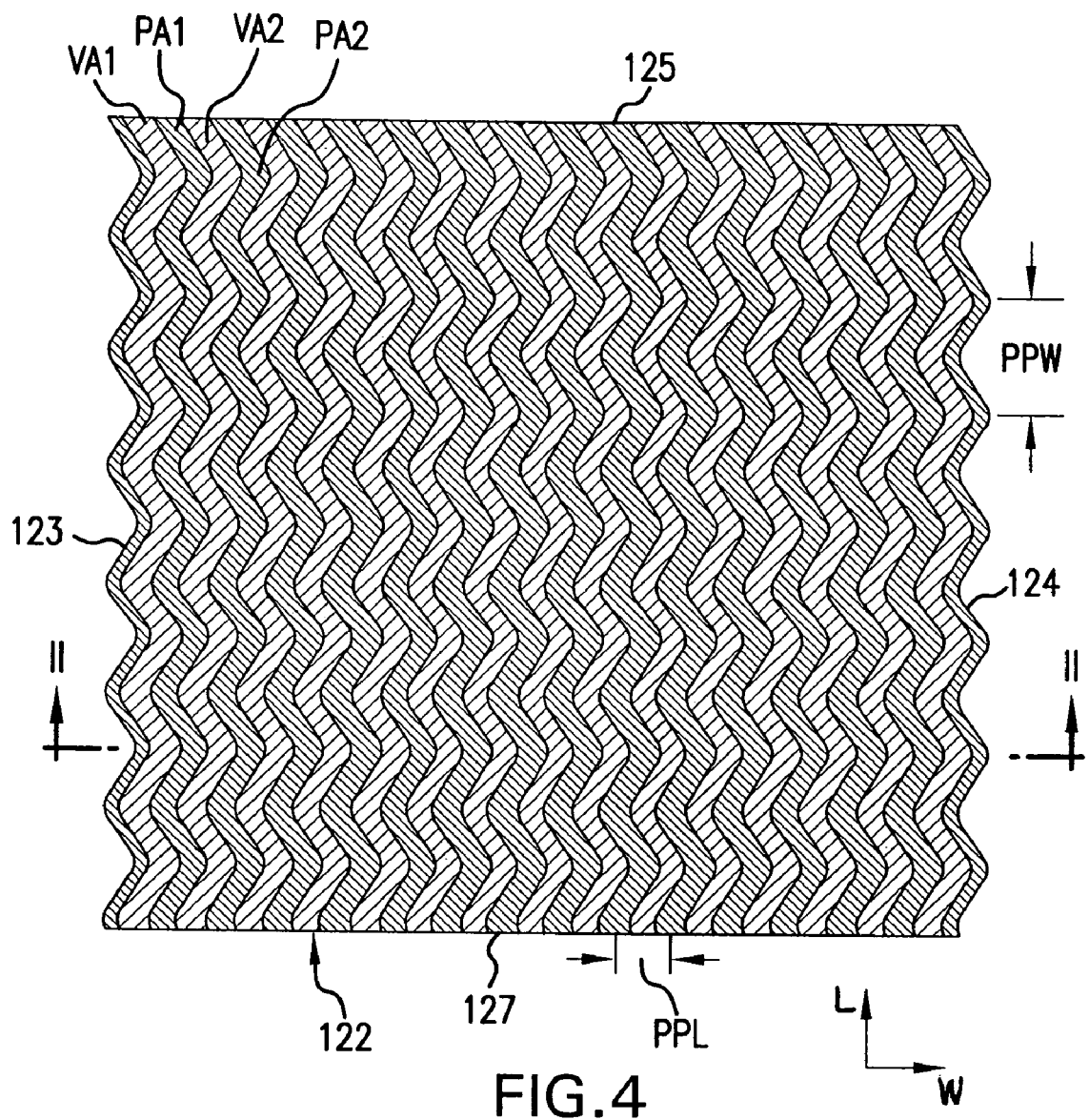
FIG. 4 shows a top plan view of a generic representation of a zig-zag or sinusoidal convoluted surfaced filter sheet produced by the convoluter of FIG. 2.
Figure 5:
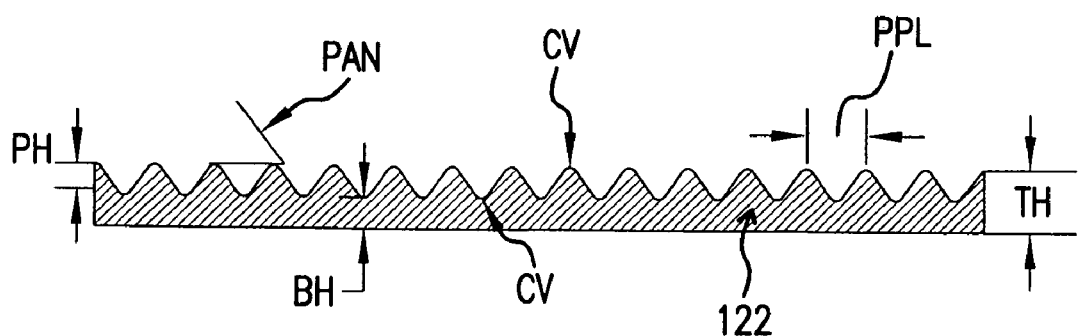
FIG. 5 shows a cross-sectional view taken along cross-section line II-II in FIG. 4.

With reference to FIGS. 4 and 5, there is seen a representative filter sheet 55A shown with a preferred filter sheet pattern of the present invention comprising a zig-zag or sinusoidal ridge, peak and valley combination across the exposed surface of the filter sheet. The FIG. 4 representation is intended to show a generic presentation of the preferred general sheet pattern with the disclosure below providing some preferred spacing and height arrangements (preferably the surface pattern for the fiber filter sheet carries directly over to the filter sheet itself). Also, while a continuous pattern is shown across the illustrated exposed surface of the fiber filter sheet, as an example of a preferred embodiment; with variations in the convoluter tooling it is possible to have different zones along the length (common with feed direction of sheet) or along the width (transverse to feed direction) or both. This would provide for different flow patterns in one common filter or the ability to provide a variety of filter types from one filter sheet. Also, there can be provided non-convoluted peripheral edging areas if, for example, a peripheral edge capture support structure is utilized. Again, however, from the standpoint of ease in manufacture as well as maintaining the preferred overall density and surface area presentation over the entire, exposed filter surface, a common pattern over the entire area subject to flow exposure is preferred and preferably over the entire flow contour side of the filter.

Figure 6:
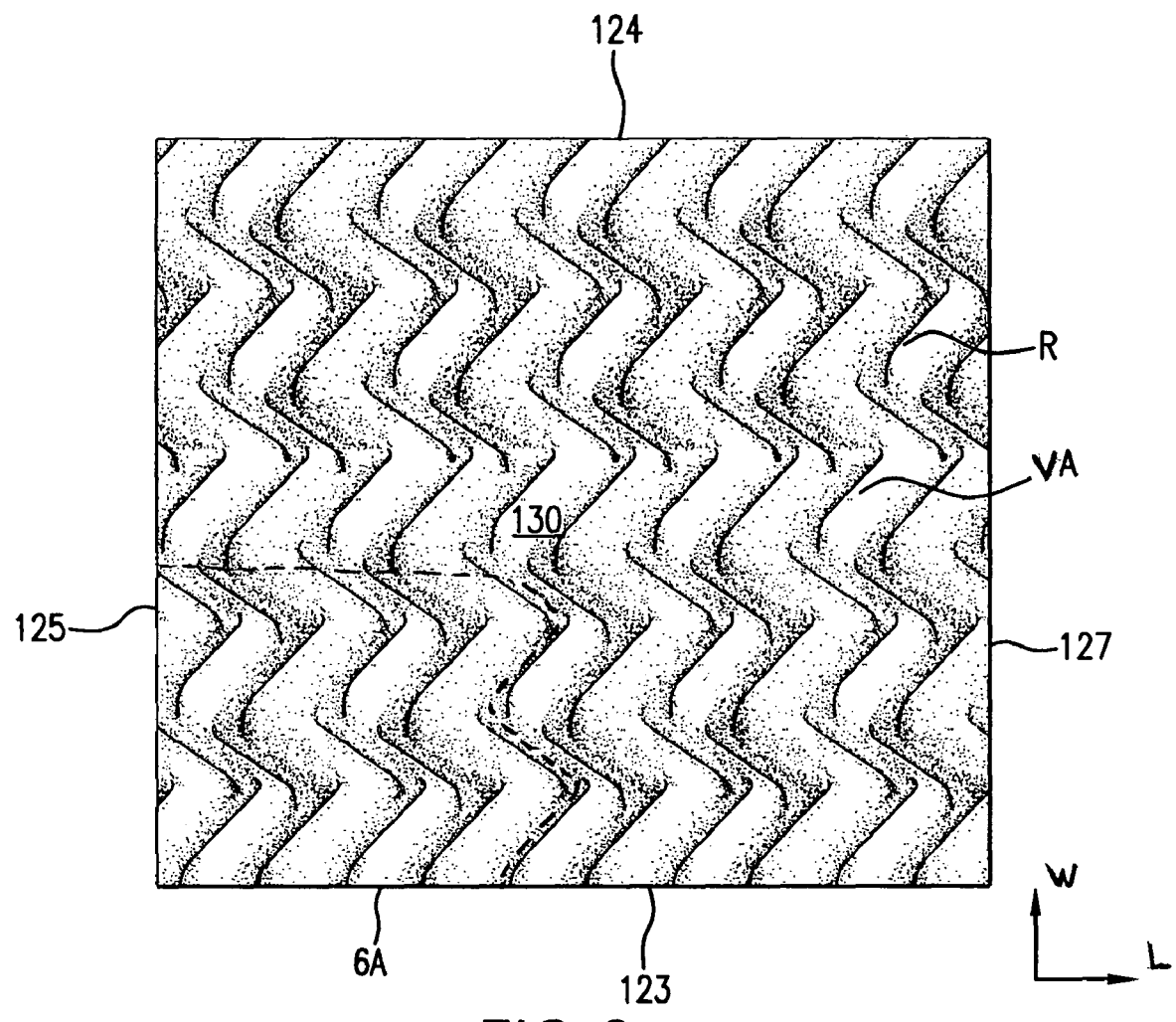
FIG. 6 shows a perspective view of a preferred embodiment of the invention generically shown in FIG. 4.
Figure 6A:
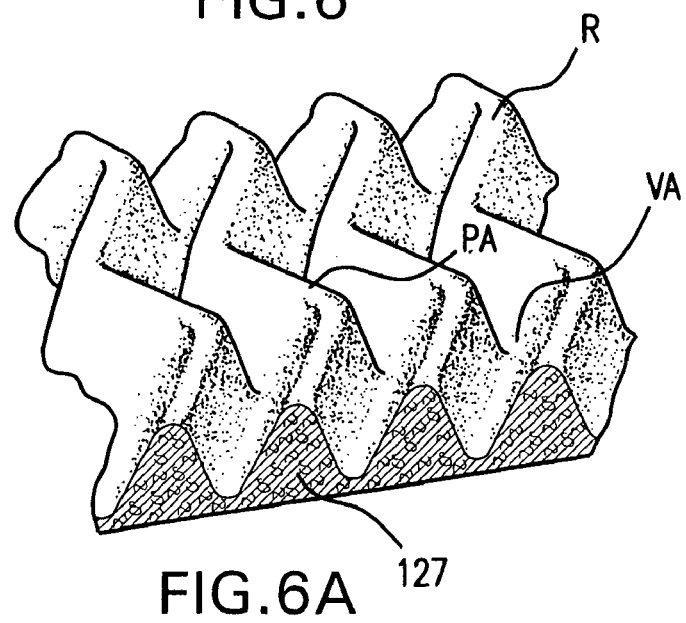
FIG. 6A shows a perspective view of the dashed-line section shown in FIG. 6.

There is further designated in FIGS. 4 and 6 the following reference numbers and/or letters having the characteristics described below in Table I (which values are provided as representations of preferred embodiments and are not intended to be limiting relative to the general subject matter of the present invention).

TABLE I

| Ref. | Description | Illustrative Range (all values in Table I in inches unless otherwise indicated) | Preferred Range | Most Preferred Range (or value) | Sample 4 |
| --- | --- | --- | --- | --- | --- |
| TH | Total fiber filter sheet thickness | 0.75-6.0 | 1.0-4.0 | 2.0 ± .50 | 2.0 |
| BH | Base height of fiber filter sheet | 0.375-3.0 | 0.5-2.0 | 1.0 ± .25 | 1.0 |
| PH | Peak height off base also (preferably equal to valley height) | .375-3.0 | .5-2.0 | 1.0 ± .25 | 1.0 |
| PPW | Peak-to-peak distance along sheet length for | 4.0 ± 1.5 | 4.0 ± 1.0 | 4.0 ± .50 | 4.0 |

TABLE I-continued

| Ref. | Description | Illustrative Range (all values in Table I in inches unless otherwise indicated) | Preferred Range | Most Preferred Range (or value) | Sample 4 |
|---|---|---|---|---|---|
| | illustrated zig-zag pattern | | | | |
| PPL | Peak-to-peak distance between ridgers across sheet width | 2.0 ± .75 | 2.0 ± .50 | 2.0 ± .25 | 2.0 |
| PAN | Slope angle [in degrees] for peak | 40-65° | 45-60° | 52.5° ± 2.5° | 52.5° |
| CV | Peak curvature (valley preferably same as peak) value determined by measurement of Autocad drawing | 0.4-0.6 | .45-.55 | .50 | .50 |
| L1 | Length of resultant filter produced | 5-80 | 10-40 | 20 ± 2.5 | 20 |
| W1 | Width of resultant filter produced | 5-80 | 10-40 | 20 ± 2.5 | 20 |

In the discussion above the reference to width "W" is made relative to the distance between the side edges extending in common with the direction of sheet travel through the convoluter while length "L" is used relative to the distance between the upstream and downstream ends of the filter sheet passing through the convoluter (or the further processed cut ends of the filter sheet is reduced in length for filter sizing). Also, the "in-use" filter orientation is preferably with the ridges running vertically and the frame support vertically extending although alternate arrangements and combinations are possible Thus, as seen from FIGS. 4 and 6 the fiber filter sheet 122 comprises a non-woven fiber material preferably being a high loft fiber filter material having a composition such as that described above and having been subjected to a convolution process like that described above for FIGS. 2 and 3. Fiber sheet 122 features opposing side walls 123 and 124 between which are positioned a plurality of projections "PA" (PA1, PA2 . . . etc.). As noted above, side walls 123 and 124 preferably represent the side edges extending in the same direction as the feed into roller set direction whereas side walls 125 and 127 represent the upstream and downstream end walls of the resultant filter. Projections are preferably in the form of continuous ridges R that are serially spaced across the width "W" while running along the length L of the fiber sheet. As shown, a preferred embodiment features ridges that extend continuously (e.g., 80 inches or more of length non-interrupted) between end walls 125 and 127.

While FIG. 4 shows a top planar view of filter sheet 122, as noted above it also illustrates a preferred vertical orientation of the filter sheet upon the filter sheet being placed in a ready-to-use state on a filter support framework such as that shown in FIG. 1B. The end walls (125, 127) are preferably the walls that are cut to provide the desired length of fiber sheet if not already of the desired size upon convoluter or surface forming means output. Also, while side walls 123 and 127 are generally aligned with the end walls of the rollers during convolution—it being noted, however, that with proper tooling alterations the length ("L") and width ("W") references for the sheet orientation of FIG. 4 can be reversed in a convolution feed though, although the preferred "in use" arrangement is as described above. Alternatively, multiple rows of commonly configured filter sheets can be output, as well as other variations. For example, while the illustrated embodiments shows a convoluter roller generally having an axial length about equal to the desired resultant filter width "W" with cutting to length required at the ends only (as for a roll feed), alternate arrangements are featured under the present invention as in the roller length being greater as in about two (or more) times the final filter width for increasing production output with a added longitudinal length cutter. Sheet 120 is shown as having length L1 and width W1 with illustrative values for the same provided in Table I above.

As seen from FIGS. 4 to 6A the convolution process imparts a three-dimensional upper surface 130 in the filter sheet, which preferably represents the initial or upstream contact surface of the filter when in use. The three dimensional convolute surface 130, as described above, comprises a projection ridge/recess pattern extending continuously along the longitudinal direction L. Further, the individual projections and recesses are shown as preferably repeating in equal spacing fashion from side wall 123 to side wall 124 in the transverse direction W. Further, the individual projection recess combinations are preferably arranged in a peak/valley combination with a preferred embodiment having the peaks in valleys in a zig-zag (or sinusoidal) pattern (e.g., each peak ridge having equal peak ridge slope extensions extending to opposite sides of a longitudinally bi-sect line passing through that peak ridge).

The inventors have discovered that attention to the surface pattern helps improve the performance filter characteristics as in particulate removal efficiency, holding capacity and pressure drop. For example, it has been determined that the zig-zag pattern improves on holding capacity relative to other surface patterns as in a convoluted "egg-crate" surface pattern found on many foam convoluted products (although for some uses, and with preferred recipe mix advantages, an egg-crate design or alternate designs represent subject matter of the present invention). Further, as explained in greater detail below, even deviations in the relative characteristics between one zig-zag shaped peak/valley surface pattern to another can enhance the filter characteristics as in paint removal efficiency. This includes for example the relative valley depth, peak height, peak configuration (e.g., the slope of attack) in the flow direction through the filter as well as the peak/valley arrangement across the width W and along the length L as in the peak amplitude along a common row and spacing dimension from row to row is a series of rows.

To illustrate the advantageous embodiments of the present invention, a discussion below is provided as to preferred fiber batt characteristics well suited for convolution in a convoluter to provide a filter sheet for filter formation. Further provided is a discussion of a preferred surface pattern of the filter fiber sheet which, particularly in combination with the described fiber batt characteristics, provides a highly efficient and highly operational filter.

Preferred recipe blends for use in formation of a fiber batt in accordance with the subject matter of the present invention as well as some comparison samples are set out in the following table(s).

TABLE II

| Reference Letter | Fiber Blend Description | Preferred Fiber Types in This Category | Preferred Denier Range | Range of % as in Batt Blend or Recipe | Preferred Range % as in Blend | Most Preferred Range or Value as in Blend |
|---|---|---|---|---|---|---|
| A | First base fiber comprised of one or more of the following fiber types | Polyester or Other Man Made Fibers | 15 denier to 40 denier | 15% to 50% | 20% to 50% | 10% to 25% |
| B | Second base fiber comprised of one or more of the following types | Polyester or Other Man Made Fibers | 40 denier to 100 denier | 15% to 85% | 30% to 75% | 40% to 60% |
| C | Binder Fiber comprised of one or more of the following types | Binder Fiber - 50%/50% Sheath/Core Or 100% lower melt component | 4 denier to 15 denier | 15% to 50% | 20% to 40% | 25% to 35% |
| BW | Basis Weight of Fiber Batt | Post convolute should be evenly distributed. | n/a | 600 g/sqm to 2100 g/sqm | 1000 g/sqm to 2000 g/sqm | 1200 g/sqm to 1800 g/sqm |
| DE | Density of Fiber Batt | n/a | n/a | 8.0 to 24.0 Kg/sqm | 9.0 to 12.0 Kg/sqm | 7.5 to 15.0 Kg/sqm |
| BT | Batt thickness (pre convolution) | n/a | n/a | 3 to 8 inches | 3.5 to 5.5 inches | 4 inches |

The above ranges values represent some of the preferred range values or values for preferred embodiments. However, as described above a variety of blend combinations are featured under the present invention. Thus, in alternate embodiments, the above referenced categories A and/or B (see left column can be dropped down in value or dropped out (0%) as in reliance on 100% binder material (category C) and/or the inclusion of one or any subcombination of A, B and C as, for example, using a spray for binder purposes in place or in addition to the thermal binder material in category C. However, the use of all three of categories A, B and C represents a preferred embodiment of the present invention.

Provided below are some sample description for filters for which their performance was tested.

Sample 1

1.5 oz Thermal Paint Arrestor Recipe Blend

| Product Description | Fiber Description | Percentage of Fiber Relative to Overall Weight of all Fibers in Recipe |
|---|---|---|
| First Base Fiber A | Stein 40 denier[1] | 55% |
| Second Base Fiber B | "Invista" 15 denier[2] | 20% |
| Binder Fiber C | "Fibertex" 4 denier binder[3] | 25% |
| Surface characteristic | Planar upstream surface - (non-convoluted and non-three dimensional) | |
| BT | Overall Filter Thickness (inches) | 1.5 |
| BW | Basis Weight of Fiber Batt | 450 g/sqm |

[1] Stein 40 denier fiber is available from Stein Fibers LTD of Albany, NY, USA and has the following qualities. 40 denier, 2" to 3" staple length preferred, 6 cpi (crimps per inch) to 10 cpi preferred, non-siliconized finish.
[2] Invista T295 15 denier fiber is available from Invista located in Wichita, KS, USA and has the following qualities. 15 denier, 2" to 3" staple length preferred, 6 cpi to 10 cpi preferred, non siliconized finish preferred.
[3] Fibertex 4 denier binder fiber is available from Fibertex A/S of Aalborg, Denmark; 4 denier, 50% sheath - 50% core preferred, 2" staple preferred.

Sample 2

3.25 oz/ft² Pre-convoluted Recipe Blend

| Product Description | Fiber Description | Percentage of Fiber Relative to Overall Weight of all Fibers in Recipe |
|---|---|---|
| A | Stein 40 denier | 55% |
| B | "Invista" T295 15 denier[2] | 20% |
| C | "Fibertex" 4d denier binder[3] | 25% |
| BT1 | Pre-convolution Thickness (inches) of Fiber Batt | 3.25" |
| BW | Basis Weight of Fiber Batt (for post convolution each piece is approximately half that value after convoluting) | 975 g/sqm |

Comparison Sample 3

| Product Description | "Paint Pocket" |
|---|---|
| Material Utilized | "Paint Pocket Product" |
| Waffle or slit and stretch layer | ¾ inch non-woven polyester with waffle pattern |
| Backing layer | ¼ inch non-woven polyester pad adhered to waffle layer |

| Sample 4 | | |
|---|---|---|
| Carpenter "TOP" Recipe Blend | | |
| Product Description | Fiber Description | Percentage of Fiber Relative to Overall Weight of all Fibers in Recipe |
| A | Stein 40 denier | 55% |
| B | Invista T295 15 denier | 20% |
| C | Fibertex 4d binder | 25% |
| BT | Pre-convolution Thickness (inches) | 4.25" |
| BW | Basis Weight of Fiber Batt (the post convolution valve is approximately half) | 1500 g/sqm |

The testing performed is set forth in the description in conjunction with the noted corresponding figures.

Test 1

A test was carried out on a filter having the characteristics of Sample 1 with the filter being a flat surface (both upstream and downstream surfaces).

Table III below sets forth the test information for the filter of Sample 1 in use in a paint spray booth environment.

TABLE III

| Test Information (Sample 1) | |
|---|---|
| Filter Description | Sample 1 Material (20" × 20" pad) |
| Paint Description | High Solids Banking Enamel (Sherwin Williams) |
| Paint Spray Method | Conventional Air gun at 40 psi |
| Spray Feed Rate | 138 gr/min/130 cc/min |
| Air Velocity | 150 fpm |

TABLE IV

| Test Results (Sample 1) | |
|---|---|
| Initial pressure drop of clean test filter | 0.05 in. water |
| Final pressure drop of loaded test filter | 0.53 in water |
| Paint holding capacity of test filter | 1663 grams (3.7 lbs) |
| Paint run off | 89 g |
| Weight gain - final filter (second in line - downstream) | 6.7 g = penetration |
| Average removal efficiency of test filter | 99.62% |

These test results are also shown in FIGS. 1C to 1F.

The tests conducted were based on ASHRAE 52.1 which is test standard incorporated herein by reference but modified to approximate the paint environment. This arrangement is considered the standard of the industry for this type of application.

Figure 1C:
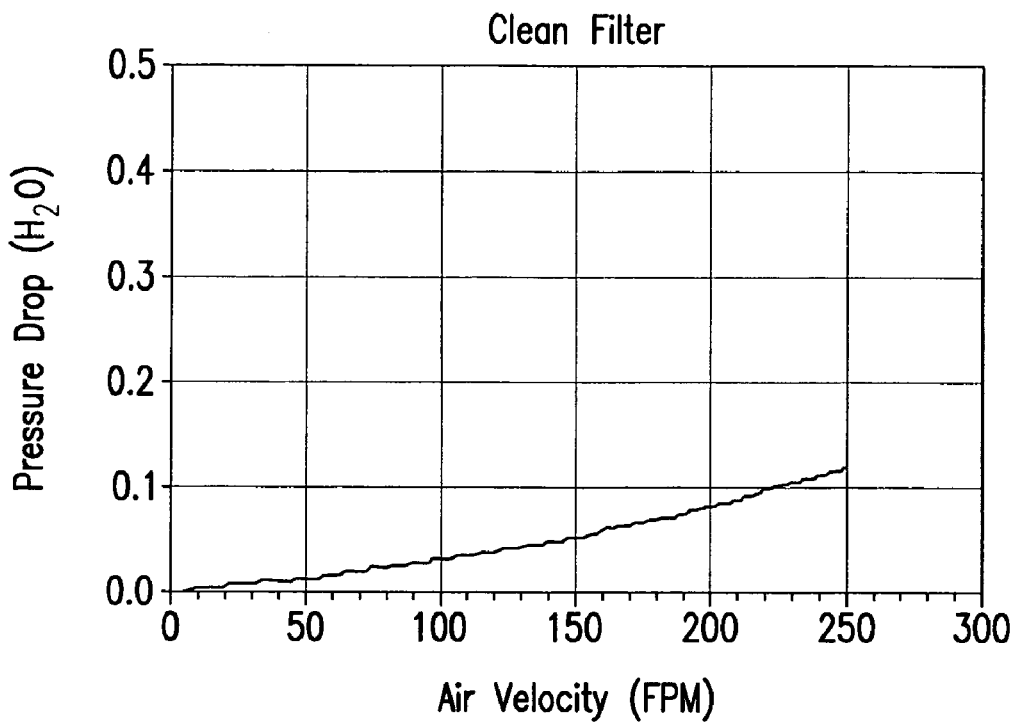
FIG. 1C is a "Clean Filter" pressure drop versus air velocity graph for Sample 1.

FIG. 1C shows the pressure drop of the filter of Sample 1 in a clean state with a flow through air velocity range of 0 to 250 feet-per-minute or fpm. FIG. 1C shows an initial pressure drop of 0.05 in water at an flow through air velocity of 150 feet per minute or "fpm".

Figure 1D:
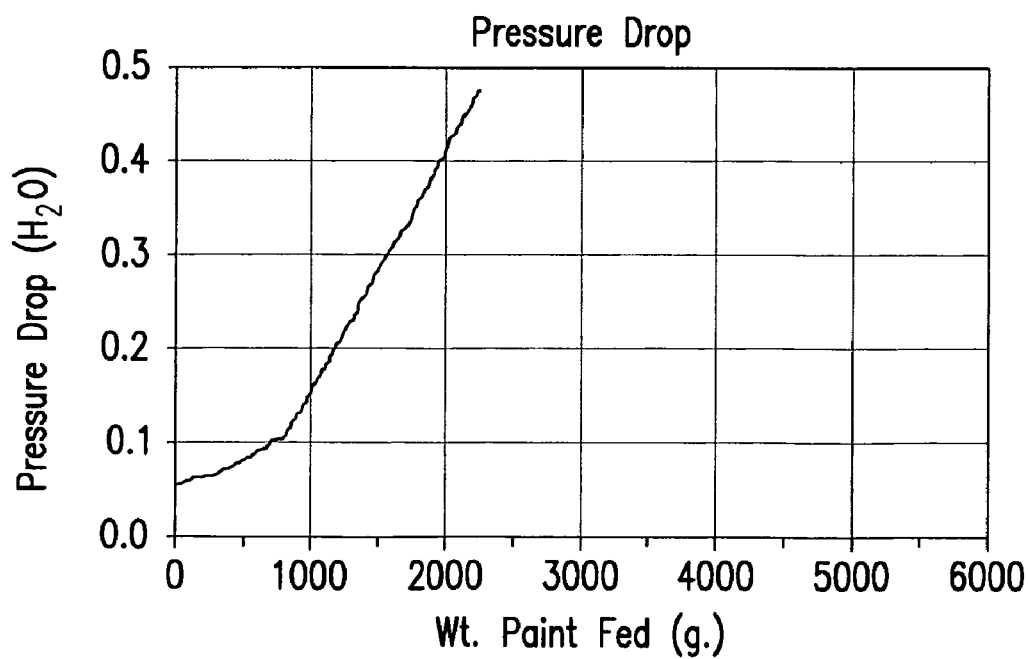
FIG. 1D is a pressure drop versus weight of fed paint or "Pressure Drop" graph for Sample 1.

FIG. 1D shows the pressure drop for the filter in Sample 1 versus the weight of paint fed through, starting at the above-noted 0.05 in $H_2O$ for a clean filter and rising sharply to a loaded test filter final pressure drop of 0.53 in water. It is noted that maximum capacity is achieved by running the test until the pressure drop reaches 0.50 in water, or 32 minutes of spraying. Based on the above-described test results and FIG. 1D the maximum load state exists with the filter having shown a paint holding capacity of 1663 g. It is noted that 1663 g is the final weight on the filter, while the FIG. 1D has a chart with an x-axis denoting total weight of paint fed. The valve value of 1662 g is based on the fact that not all paint fed ends up on filter or in the run-off trough.

In this test there was also experienced a 89 g paint run off which is a measured amount based on the paint that runs off the filter into a trough.

Figure 1E:
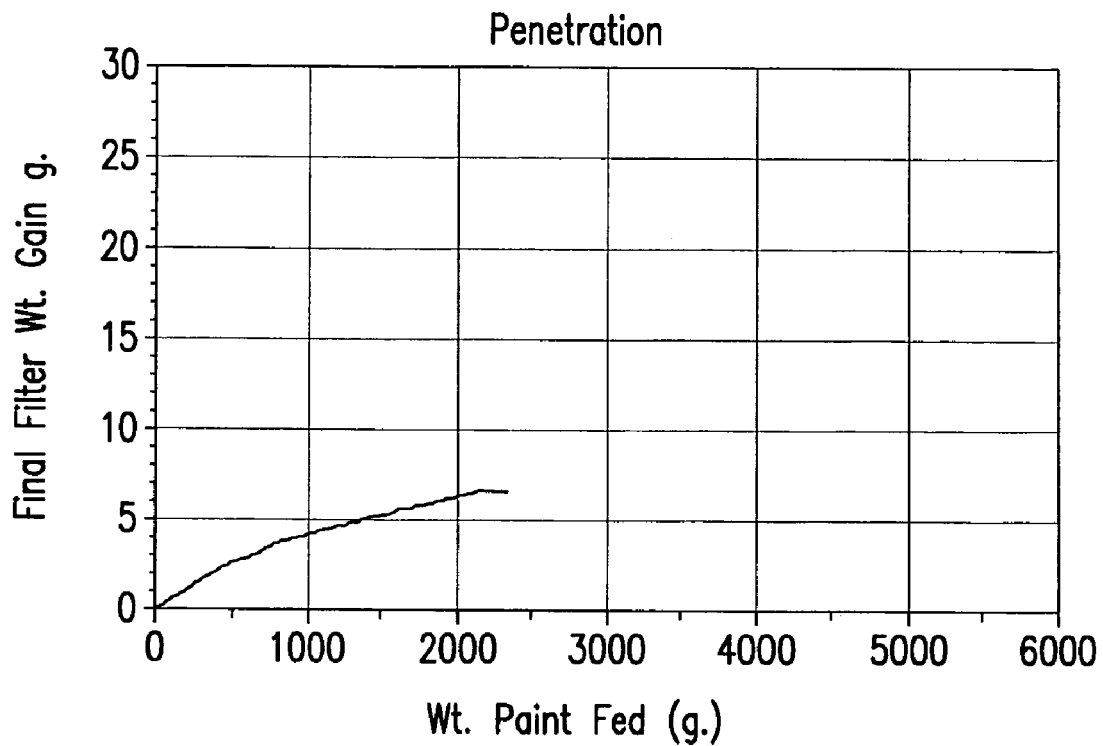
FIG. 1E is a final filter weight gain versus weight of paint fed or "Penetration" graph for Sample 1.

There is further shown in FIG. 1E the amount of paint not blocked by filter and which reach or "penetrates" the second or downstream filter. For Example 1 the amount of penetration is 6.7 grams of paint which, like the holding capacity calculation for the first filter is carried out by way of a before and after precision weighing of the filter involved. In the testing, the final filter in the test is not the same as the first, but instead is a conventional filter designed for high efficiency to capture as much paint as possible to give an accurate assessment of the paint traveling through the test filter.

Figure 1F:
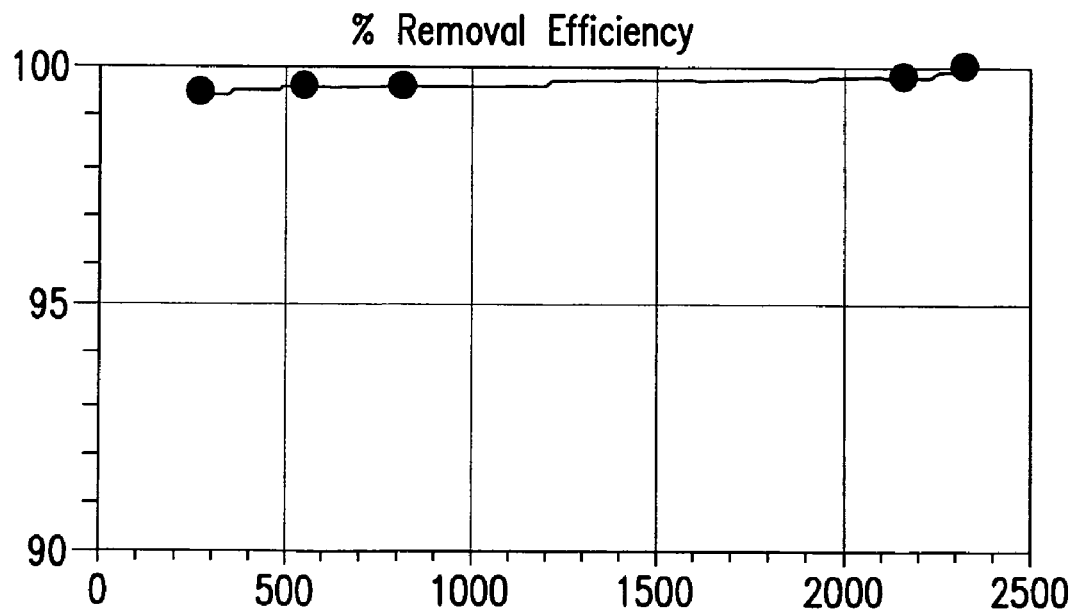
FIG. 1F is a percentage of filter removal versus the weight of paint fed or "% Removal Efficiency" graph for Sample 1.

FIG. 1F shows a graph for the removal efficiency for various data points which correspond to specific times during the test. The first three points are taken every 2 minutes. The $4^{th}$ point is taken at 10 minutes, the fifth point at 16 minutes, and the final point 10 minutes later.

Test 2

A test was carried out on a filter having the characteristics of Sample 2 with the filter being a convoluted surface having the general convolution pattern represented by FIG. 4 but having "smaller" characteristics as compared to the above and below described Sample 4 characteristics relative to, for example, peak height and spacing as described above.

Thus, with reference to the schematic depictions in FIGS. 4 and 5 there can be seen a zig-zag convolution pattern formed in a filter fiber sheet to produce the filter having the "smaller" characteristics as compared to the more preferred Sample 4 embodiment described below. Table V below sets forth the test information for the filter Sample 2 in use in a paint spray booth environment while Table V1 provides the test results for Sample 2.

TABLE V

| Test Information (Sample 2) | |
|---|---|
| Filter Description | Sample 1 Material (20" × 20" pad) |
| Paint Description | High Solids Banking Enamel (Sherwin Williams) |
| Paint Spray Method | Conventional Air gun at 40 psi |
| Spray Feed Rate | 138 gr/min/130 cc/min |
| Air Velocity | 150 fpm |

TABLE VI

| Test Results (Sample 2) | |
|---|---|
| Initial pressure drop of clean test filter | 0.11 in. water |
| Final pressure drop of loaded test filter | 0.52 in water |
| Paint holding capacity of test filter | 2207 grams (4.9 lb.) |
| Paint run off | 97 g |
| Weight gain - final filter (second in line - downstream) | 5.4 g = penetration |
| Average removal efficiency of test filter | 99.77% |

Description of Sample 2 Test and Results

Figure 7A:
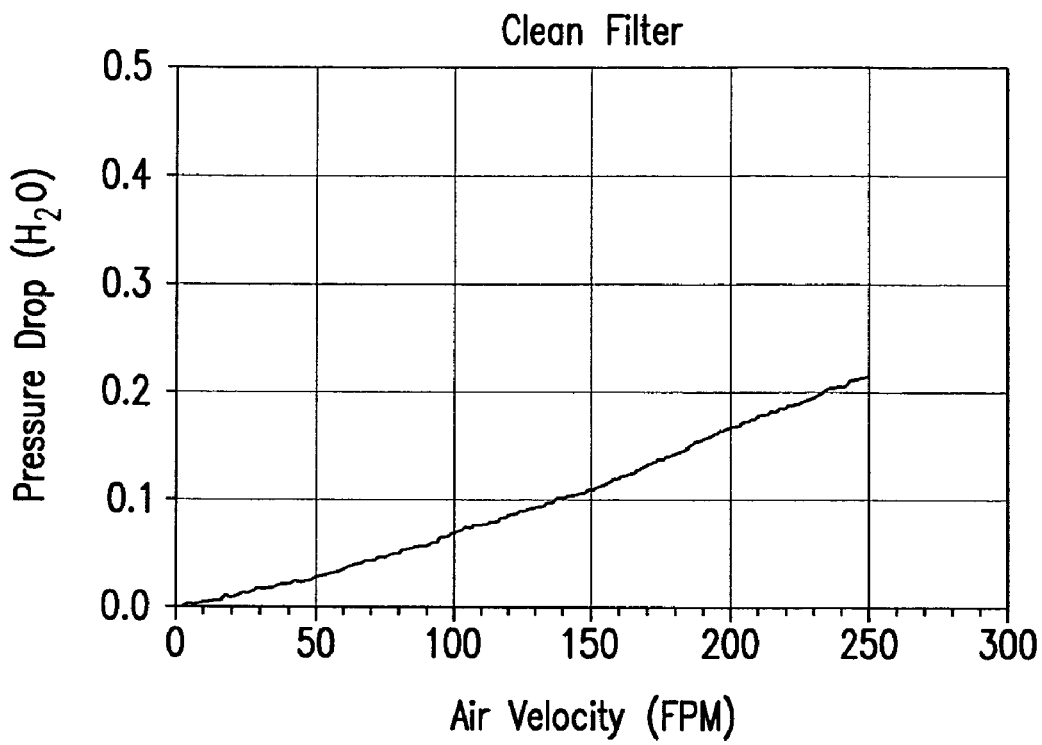
FIG. 7A is a "Clean Filter" pressure drop versus air velocity graph for Sample 2.

FIG. 7A shows the pressure drop of a clean "Sample 2" filter (i.e., the convoluted filter with the convolution surface on the upstream side relative to air flow and the non-convoluted surface on the downstream side—a preferred arrangement for the filter although opposite multi-sided convoluted surface filter embodiments are also contemplated in the event of, for example, a reversible flow filtering system). As seen from FIG. 7A, for an air flow of 150 FPM there was an initial pressure drop of 0.11 in water for the clean filter.

Figure 7B:
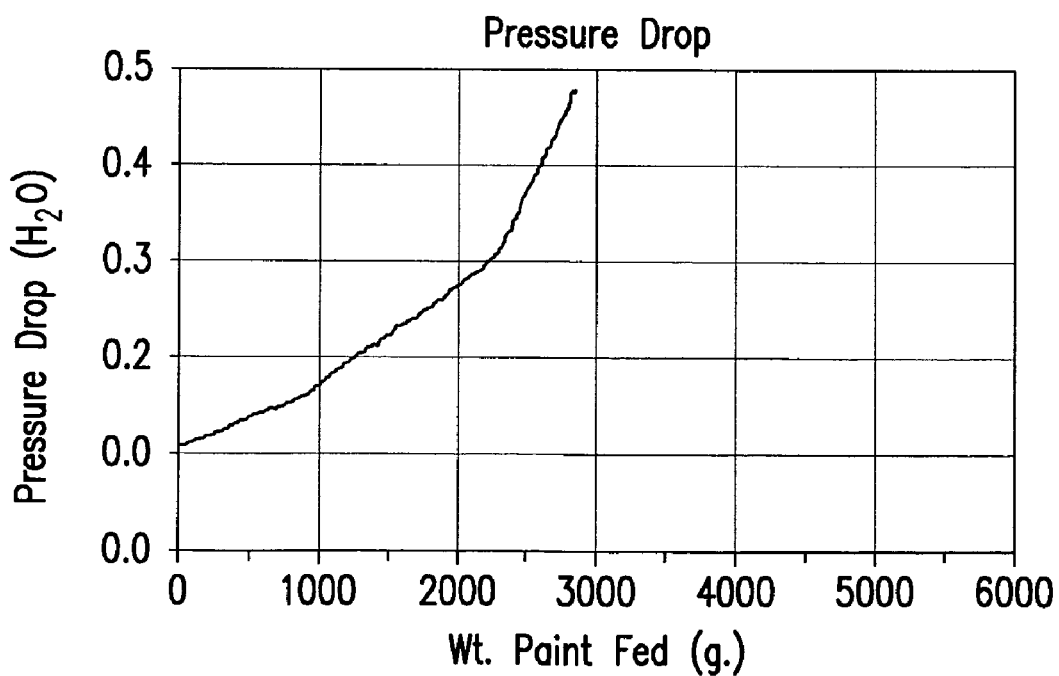
FIG. 7B is a pressure drop versus wet paint "Pressure Drop" graph for Sample 2.

FIG. 7B shows the pressure drop for the filter in Sample 2 versus the weight of paint fed through starting at the above-noted clean filter pressure drop of 0.11 in water and showing a loaded filter, final pressure drop of 0.52 in water.

Paint holding capacity of 2207 g was also in conjunction with a 97 g paint run-off.

Figure 7C:
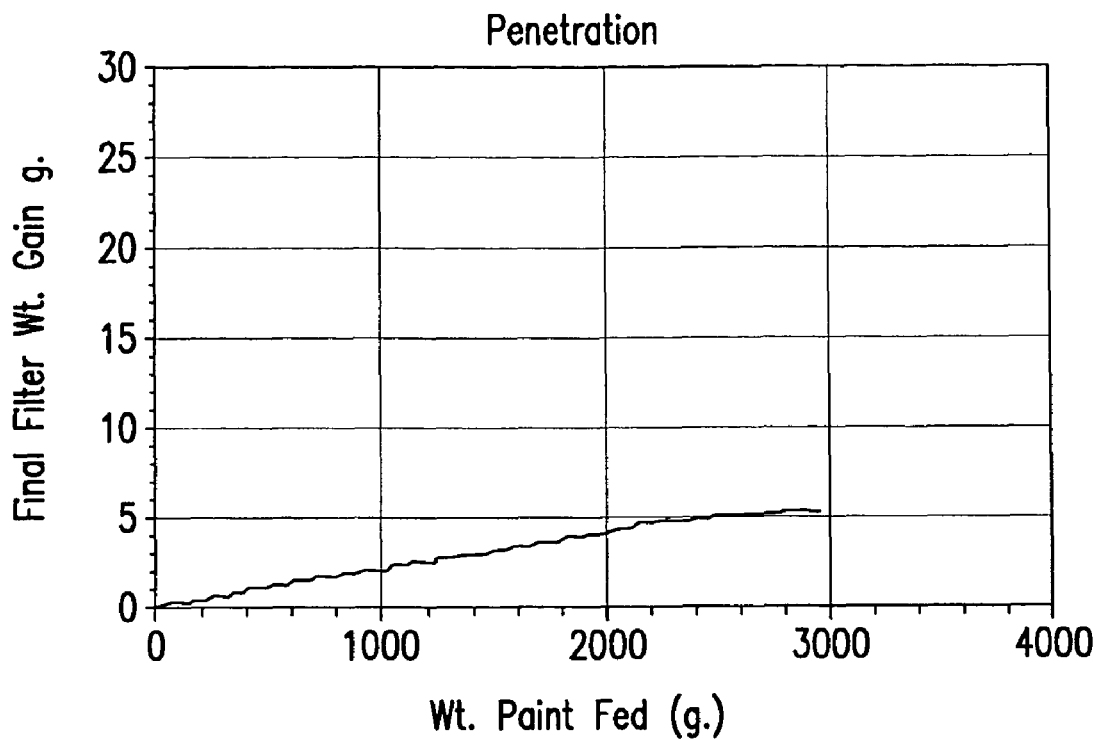
FIG. 7C is a final filter weight gain versus weight of paint fed or "Penetration" graph for Sample 2.

FIG. 7C shows a penetration value or the amount of weight gain in the final filter of 5.4 g.

Figure 7D:
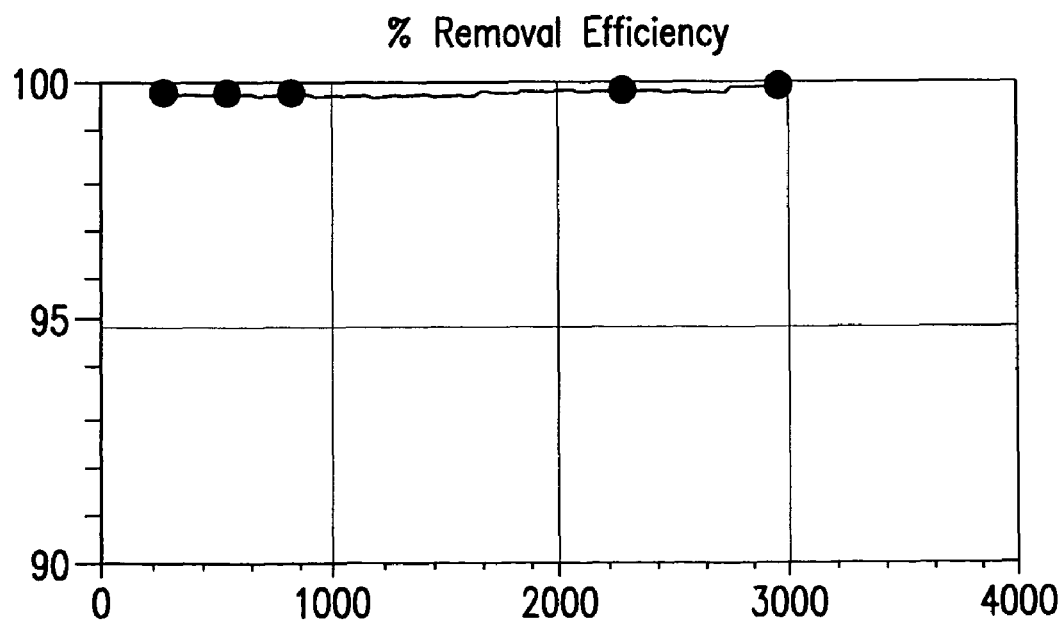
FIG. 7D is a percentage of filter removal versus the weight of paint fed or "% Removal Efficiency" graph for Sample 2.

FIG. 7D shows the average removal efficiency of the test filter represented by Sample 2 of 99.77% determined by (2207/(2207+97+5.4)). When the pressure drop of the loaded filter exceeds 0.50 in water, the filter can become too restrictive to maintain a desired airflow in the booth and thus a filter change is deemed required as excessive run-off means more cleaning issues in the booth. Factors such as time to load up and how much run-off are some of the potential factors considered when determining whether a product is commercially acceptable or not.

As can be seen by a comparison of the non-convoluted Sample 1 filter and the convoluted Sample 2 filter, although at the same general weight range specification, the Sample 2 realized an increase of paint holding capacity of 1.2 lbs. to 4.9 lbs. relative to Sample 1. This is an increase of 32% over the non-convoluted pad. Further testing has revealed that by increasing the weight to a pad weight of 2.0 oz/sqft after convoluting, paint-holding capacity can be increased to 5.7 lbs. This is accomplished without lamination or varying the fiber blend and density within the matrix of the fiber. Thus, convoluting the surface of the fiber results in appreciable increases in paint holding capacity without having to vary blends, add additional webs, or vary the density within the fiber bat.

As described in the background portion of the present application, while Sample 2 shows significant improvement over conventional filters, further improvements resulted in even better performance and quality and consistency in the resultant end product filter produced under the present invention with an embodiment represented by Sample 4.

Test 3

To illustrate the improvements made over Sample 2, Test 3 was run wherein Sample 4 was produced and tests carried out. The characteristics of the filter produced is described in Table VII below.

TABLE VII

| Ref. | Description | Sample 4 Values |
|---|---|---|
| TH | Filter sheet thickness | 2.0" |
| BH | Base height of filter sheet | 1.0" |
| PH | Peak height off base also (preferably equal to valley height) | 1.0" |
| PPW | Peak-to-peak distance across sheet width | 2.0" |
| PPL | Peak-to-peak distance along length for illustrated zig-zag pattern | 4.0" |
| PAN | Slope angle for peak | 52.5° |
| CV | Peak curvature (valley preferably same) | .50 |
| BTP | POST-convolution Thickness (inches) | 2.0" |

The test carried out on Sample 4 is presented below

TABLE VIII

Test information Sample 4

| | |
|---|---|
| Filter Description | ¾" poly. waves front on 1 ¼" backing white (this filter is formed as a monolithic fiber body with a generally constant density and fiber make up both in overall depth and across the width and length of the filter 20" × 20") |
| Paint Description | High Solids Permaclad (Sherwin Williams Permaclad 2400) (same as Test 1) |
| Paint Spray Method | Conventional Air gun at 40 psi |
| Spray Feed Rate | 134 gr/min |
| Air Velocity | 150 FPM |

TABLE IX

Test Results (Sample 4)

| | |
|---|---|
| Initial pressure drop of clean test filter | 0.08 in. water |
| Final pressure drop of loaded test filter | 0.50 in water |
| Weight gain on test filter and test frame | 4160 g |
| Paint holding capacity of test filter | 3714 grams (8.2 lbs) |
| Paint run off | 446 g |
| Weight gain - final filter (second in line - downstream) | 17.7 g = penetration |
| Average removal efficiency of test filter | 99.58% |

As seen from the above Test Result Table VIII and FIGS. 9A to 9D, Sample 4 provided a filter having a paint holding capacity of 3714 g with a removal efficiency of 99.58% which is workable in most systems. This holding capacity represents a distinct improvement when considering the ease of manufacture and low expense associated with the production of a filter like in Sample 4. That is, the filter of Sample 4 represents a high performance filter that provides the operator with extended usage duration; thus reducing the amount of downtime an operator experiences. As also seen from the Sample 4 blend description above, the blend of fiber deniers utilized in Sample 4 has a majority of fiber deniers in excess of 15 denier with the preferred majority being 25 denier or higher and more preferably a 40 denier fiber is utilized as the majority percentage of the blend. Suitable "base" fiber material is/are preferably selected from one or any sub-combination of the following fibers having chemical description such as polyester, and polypropylene or the like. These types of fibers can be derived from a variety of sources such as brand fibers of Wellman, DAK, Invista, Far Eastern Textiles, Nanya. Also, deniers such as 40 to 100 denier are preferred. Also, the binder percentage is preferably 15% or higher and more preferably 20 to 40% and more preferably from 25% to 30% with the preferred binder being 50%/50% sheath core—polyester low melt sheath/polyester high melt sheath. Solid low melt polyester and/or solid polypropylene binders or the like can be used as well. These types of fibers can be obtained from a variety or sources with the following brand fibers representing some possible selections: Huvis, Sahan, Nanya brand fibers.

Suitable "base A" fibers include one or any subcombinant of the above materials (noting that the "base" fiber material can constitute a single fiber type or a fiber mix from the above-noted fiber group):

Suitable "base B" fibers include one or any sub-combination of the above materials (noting that the "base" fiber material can constitute a single fiber type or a fiber mix from the above-noted fiber group):

Further the above blend discussion for Sample 4 represents a fiber batt that is well suited for crisp and high integrity convoluting. The convoluting process is preferably set up such that the rollers have a compression spacing and tooling as to generate three dimensional surface patterns having the characteristics described above.

Test 4

To help illustrate the advantages represented by the above-described test results for Sample 4 relative to paint arrester filters on the market, Sample 3 was tested with Sample 3 representing a commercial "paint pocket" filter.

That is, a test was carried out on a filter having the characteristics of a ¾ inch "waffle front" (believed to be a traditional slit and stretch formed diamond paint pocket forming arrangement) mounted on a ¼ inch independent base pad of a common material. As seen from Table XI below, the paint description and paint spray method was the same as that for Test 3 (High-Solids Permaclad, Sherwin Williams Permaclad 2400) with a spray based on conventional air gun at 40 psi.

TABLE X

Test Description (Sample 3)

| | |
|---|---|
| Filter Description | Sample 3 ¾" polyester waffle front on 1 ¼" polyester backing, white adhesive laminate |
| Paint Description | High Solids Permaclad (Sherwin Williams Permaclad 2400) (same as Test 3) |
| Paint Spray Method | Conventional Air gun at 40 psi |
| Spray Feed Rate | 144 gr/min (it is noted that138 cc/min in test 3 with same 130 cc/min round off for test 3 and 4 with the difference being considered within acceptable difference and thus not considered an appreciable added variable |
| Air Velocity | 150 FPM |

TABLE XI

Test Results (Sample 3)

| | |
|---|---|
| Initial pressure drop of clean test filter | 0.07 in. water |
| Final pressure drop of loaded test filter | 0.20 in water |
| Weight gain on test filter and test frame trough | 4073 g |
| Paint holding capacity of test filter | 3020 g (6.7 lbs) |
| Paint run off | 1053 g |
| Weight gain - final filter (second in line - downstream) | 11.8 g = penetration |
| Average removal efficiency of test filter | 99.71% |

Figure 8A:
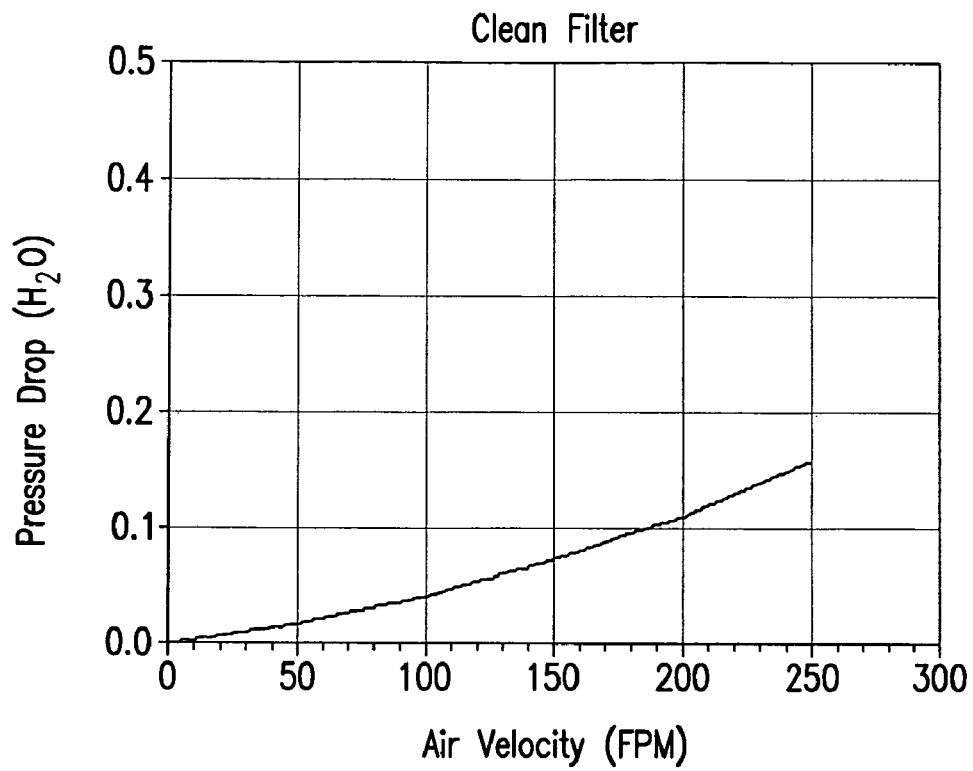
FIG. 8A is a "Clean Filter" pressure drop versus air velocity graph for Sample 3.

FIG. 8A shows the pressure drop of a clean Sample 3 filter (i.e., a filter having waffle like upstream surface with a solid backing layer). As seen from FIG. 8A for an air flow of 150 FPM there was an initial pressure drop of 0.07 for a clean test filter.

Figure 8B:
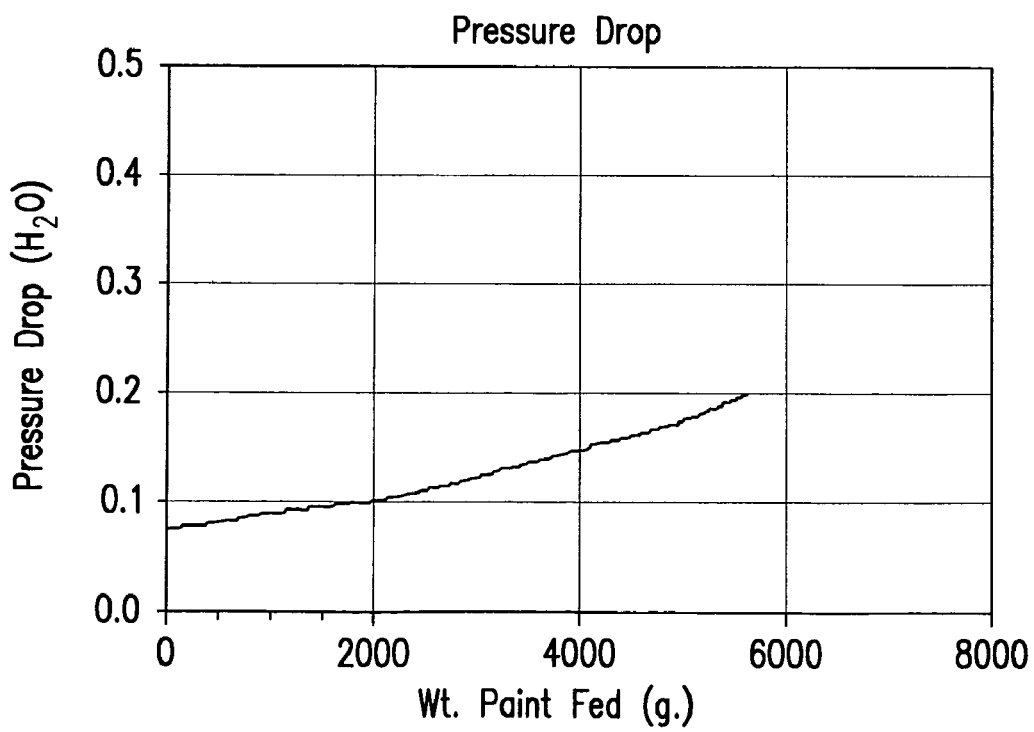
FIG. 8B is a pressure drop versus weight of fed paint or "Pressure Drop" graph for Sample 3.
Figure 8C:
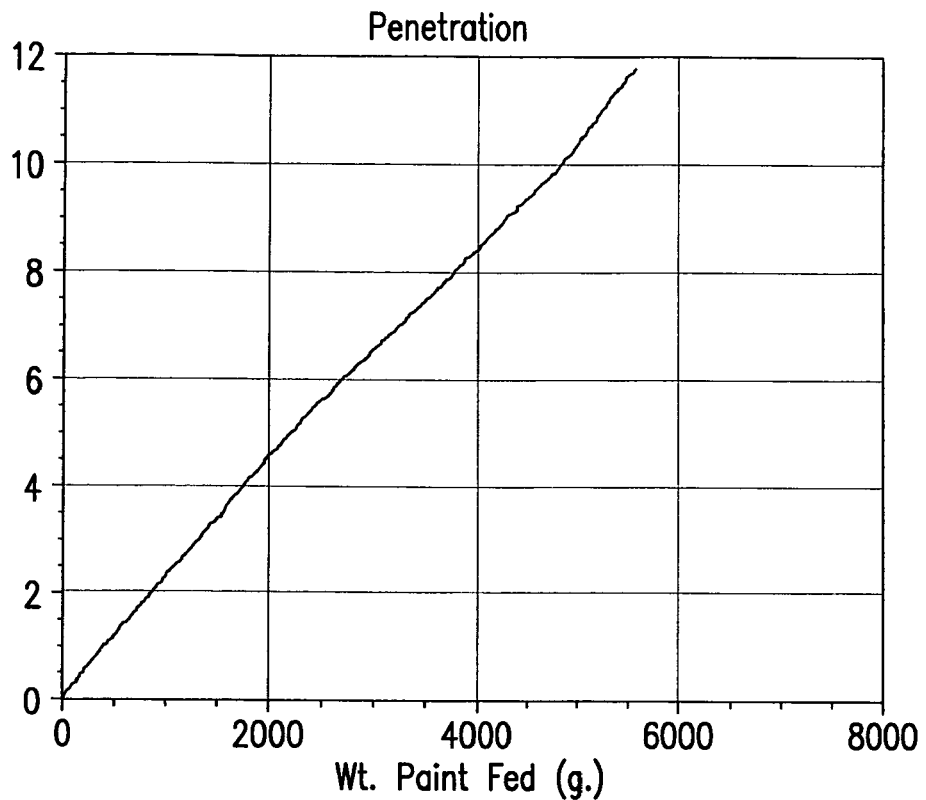
FIG. 8C is a final filter weight gain versus weight of paint fed or "Penetration" graph for Sample 3.
Figure 8D:
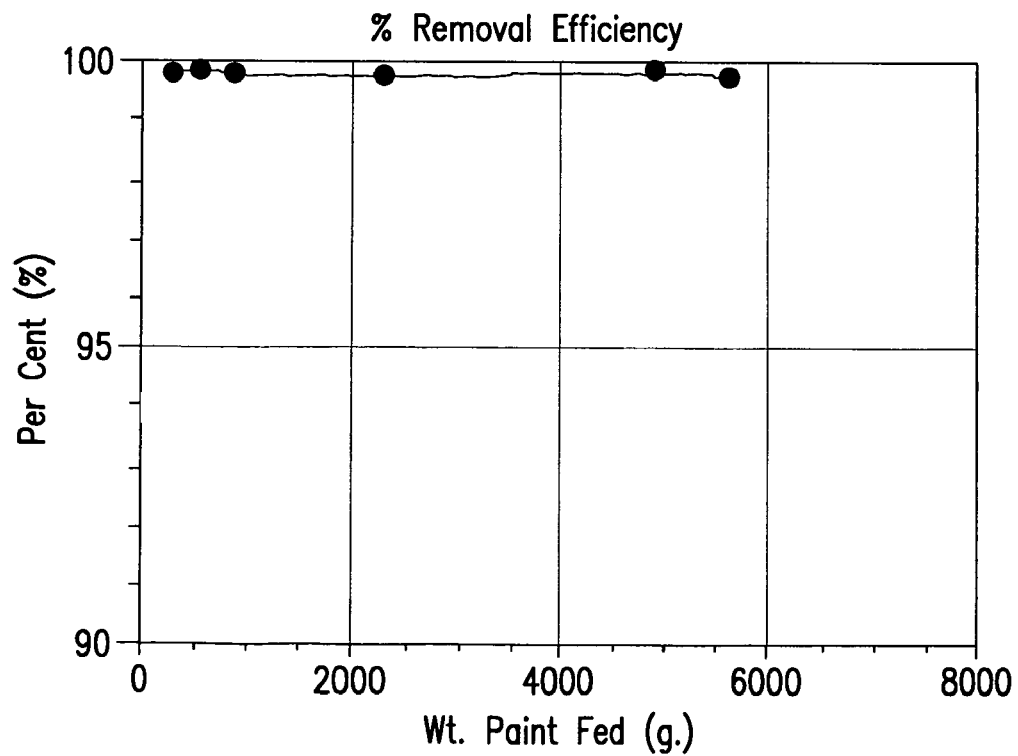
FIG. 8D is a percentage of filter removal versus the weight of paint fed or "% Removal Efficiency" graph for Sample 3.
Figure 9A:
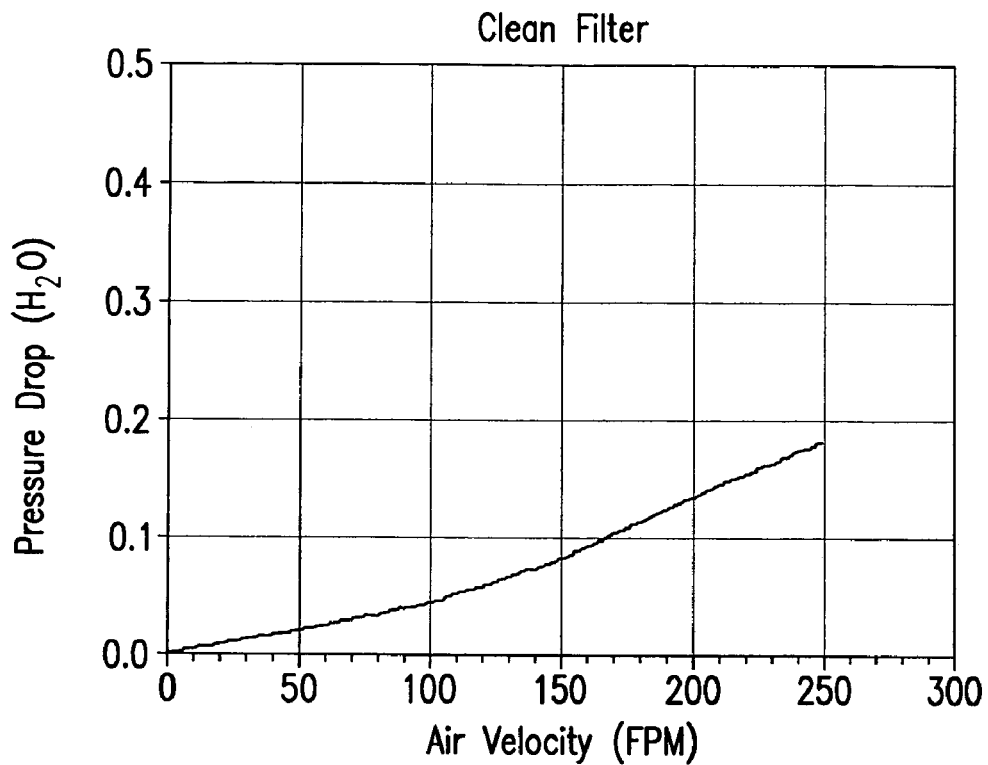
FIG. 9A is a "Clean Filter" pressure drop versus air velocity graph for Sample 4.
Figure 9B:
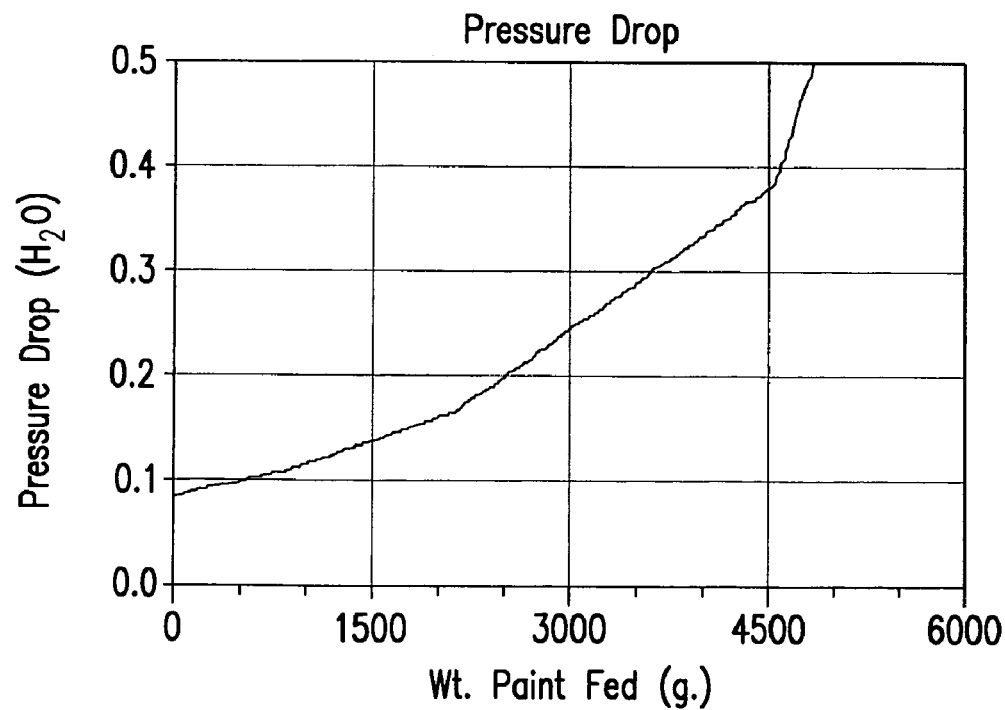
FIG. 9B is a pressure drop versus weight of fed paint or "Pressure Drop" graph for Sample 4.
Figure 9C:
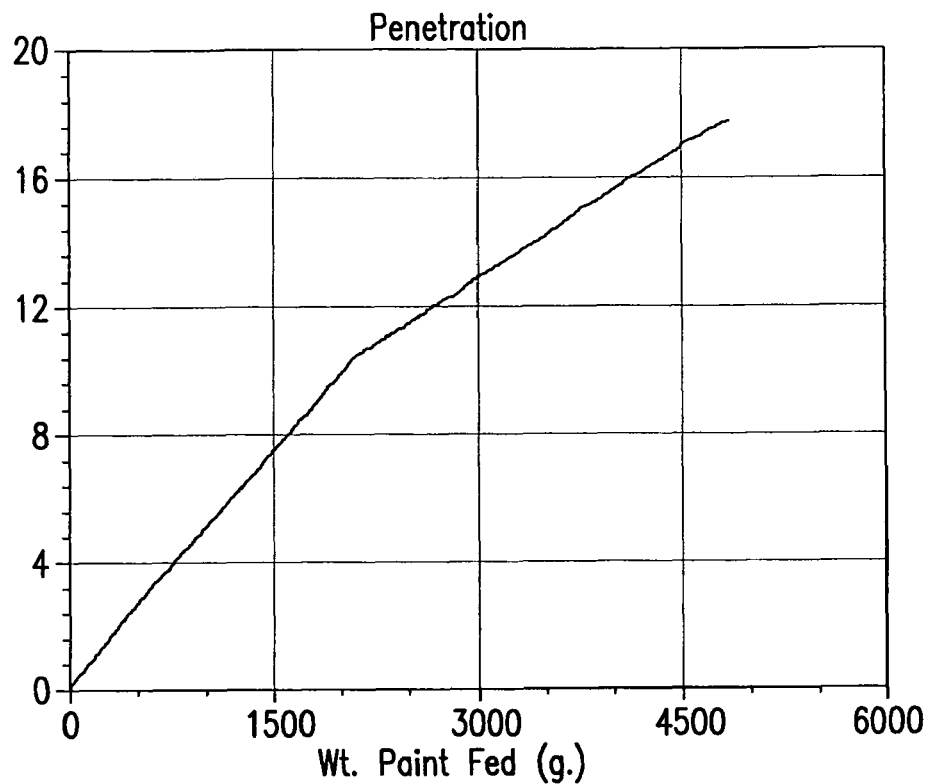
FIG. 9C is a final filter weight gain versus weight of paint fed or "Penetration" graph for Sample 4.
Figure 9D:
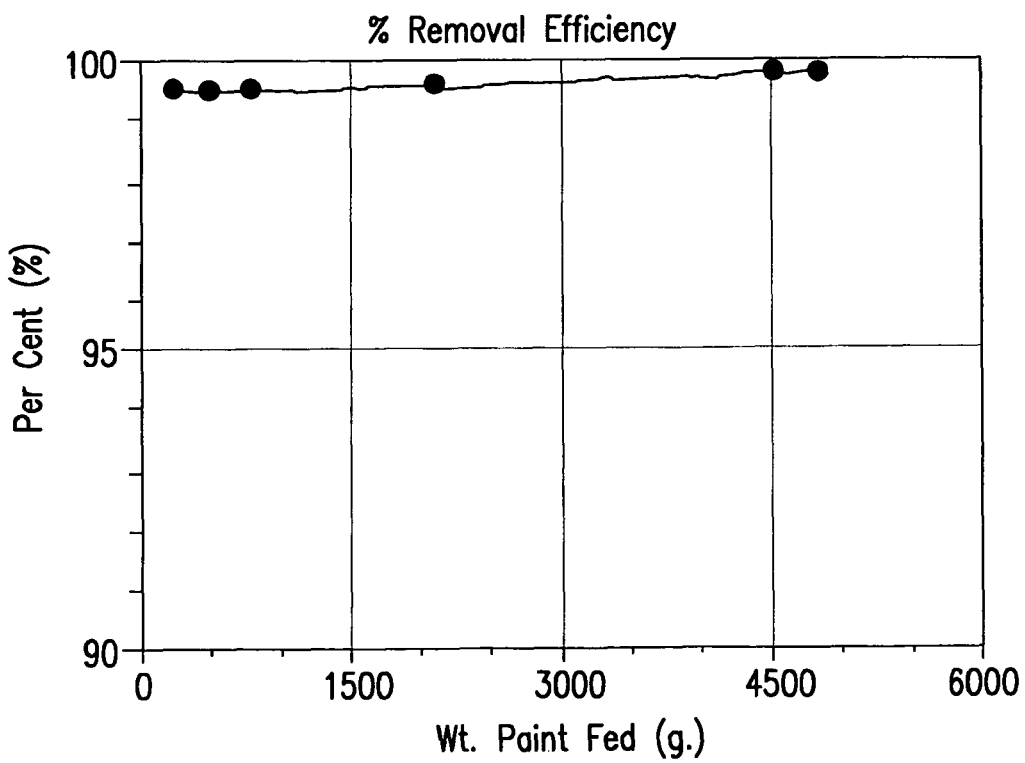
FIG. 9D is a percentage of filter removal versus the weight of paint fed or "% Removal Efficiency" graph for Sample 4 (with weight of paint "fed" being based on how much is poured into the sprayer and ejected from the sprayer).

FIG. 8B shows the pressure drop for the filter 7 Sample 3 for a wet paint feed through starting at the above-noted clean filter pressure drop and showing a loaded filter final pressure drop of 0.20 in water.

A comparison of the test results for Sample 3 to comparison Sample 4 shows an improved paint holding capacity relative to Sample 4 (3714 g for Sample 4 and 3020 g for Sample 3). This being achieved with the advantage of a highly efficient convolution surface formation technique as compared, for example, to a slit and stretch of an upper layer followed by adherence of that upper layer to a lower layer as is utilized in conventional filters to achieve a "waffle" surface contour.

Also, while a comparison of Sample 2 with the Sample 3 and 4 tests results shows a lesser holding capacity in Sample 2, for some applications the benefits of the rapid and greater efficiency in filter production method achievement with the above-described convolution process (e.g., only a single process step consisting of a feed through of a fiber batt through a pair of convoluters (typically a pair of compression rollers with circular die plates or cylinders as in a Kirchoff AG convolutor roller set assembly, although other convolution means are featured under the present invention including systems where the "rollers" are represented by conveyor belts or conveyer belt/individual roller combinations, or tooling plates and conveyer combinations, as well as other convoluting equipment such as that utilized in the convolution foam). That is, the formation of a final filter sheet having the final desired surface configuration comprises a one step feeding of the fiber batt through the convoluter wherein, not just one, but two viable filter sheets are formed (showing a further efficiency in this form of convoluter based formation method). The end result filter can then be simply formed under any conventional final cutting operation if the filter sheet is not of the same configuration as the final filter characteristics (e.g., a filter sheet set versus a filter pad for insertion in a multi-operative frame wall support structure). In the former case the fiber batt has generally the same peripheral configuration as the filter sheet and the filter sheet has the same general configuration as the end filter product such further securement of layers and/or slitting and stretching of a layer is not required.

The invention claimed is:

1. A filter, comprising:
a fiber filter body comprising a base and a plurality of projections extending from said base, and wherein said fiber filter body is a monolithic, non-woven fiber material body that is comprised of a fiber blend having a convoluted surface with projections that are in the form of zig-zag shaped rows which are separated by zig-zag shaped recesses, and wherein an interface region between each projection and supporting base is formed of a continuous blend of the fibers of said fiber blend, the improvement which comprises,
said fiber filter body has said projections extending for 50% or more of a total thickness of said fiber filter body, and wherein said non-woven fiber filter body has a basis weight of between 500 g/sqm to 1000 g/sqm with a thickness of 1.5 inches to 3.0 inches.

2. The filter of claim 1 wherein said non-woven fiber filter body has a basis weight of between 600 g/sqm to 900 g/sqm with a thickness of 1.75 to 2.5 inches.

3. The filter of claim 1 wherein said projections represent about 60 to 85% of the height of said fiber filter body.

4. The filter of claim 3 wherein said non-woven fiber filter body has a basis weight of between 600 g/sqm to 900 g/sqm with a thickness of 50 to 75 mm.

5. The filter of claim 1 wherein said projections are rounded peak rows with rows that are spaced apart by 2+/−0.75 inches.

6. The filter of claim 1 wherein said projections have a side wall slope of 52.5°±2.5° on each side of the projection as to provide, in cross-section, a rounded peak hill shape.

7. The filter of claim 1 wherein said filter is a paint arrestor filter designed to provide a paint holding capacity of 6.8 pounds or more per 20 inch by 20 inch area of said paint arrestor filter before reaching about 0.50 pressure drop across said filter.

8. A filter, comprising:
a fiber filter body comprising a base and a plurality of projections extending from said base, and wherein said fiber filter body is a monolithic, non-woven fiber material body that is comprised of a fiber blend having a convoluted surface with projections that are in the form of zig-zag shaped rows, the improvement which comprises, said fiber filter body has a basis weight of between 500 g/sqm to 1000 g/sqm with a thickness of 1.5 inches to 3.0 inches.

9. The filter of claim 8 wherein said non-woven fiber filter body has a basis weight of between 600 g/sqm to 900 g/sqm with a thickness of 50 to 75 mm.

10. The filter of claim 8 wherein said projections represent about 60 to 85% of the height of said fiber filter body.

11. A method of using the filter of claim 1, comprising:
providing the filter in a fluid flow path and removing material in the fluid flow path with the filter.

12. The method of claim 11 wherein providing the filter includes providing the filter to a support in a paint booth such that the filter functions as a paint arrestor.

13. A filter, comprising:
a fiber filter body comprising a base and a plurality of projections extending from said base, and wherein said fiber filter body is a monolithic, non-woven fiber material body that is comprised of a fiber blend having a convoluted surface with projections that are in the form of zig-zag shaped rows, the improvement which comprises, said fiber filter body has said projections extending for 50% or more of a total thickness of said fiber filter body, and wherein the non-woven fiber filter body is comprised of a recipe of fibers having a majority of the overall fibers of 40 denier to 100 denier, and the fiber blend is essentially continuous in density from a first fluid contact side to an opposite side of said filter relative to fluid flow through said filter, and wherein said non-woven fiber filter body has a basis weight of between 500 g/sqm to 1050 g/sqm with a thickness of 1.0 inches to 4.0 inches.

14. The filter of claim 8 wherein the non-woven fiber filter body is comprised of a recipe of fibers with a majority of the overall fibers being of 40 denier to 100 denier.

15. A filter, comprising:
a fiber filter body comprising a base and a plurality of projections extending from said base, and wherein said fiber filter body is a monolithic, non-woven fiber material body that is comprised of a fiber blend having a convoluted surface with projections that are in the form of rows with intermediate elongated recesses, the improvement which comprises, said fiber filter body has said projections extending for 50% or more of a total thickness of said fiber filter body, and wherein the non-woven fiber filter body is comprised of a recipe blend of polymer fibers of 10 to 50% by weight if fibers of 15 denier to 40 denier; 15 to 85% by weight of fibers of 40 denier to 100 denier and 15 to 50% by weight of binder fibers of 4 to 15 denier, and wherein said fiber filter body has a basis weight of between 500 g/sqm to 1050 g/sqm.

16. The filter of claim 15 wherein the binder fiber is a sheath-core binder fiber.

17. The filter of claim 15 wherein the recipe includes 20 to 50% polymer fibers of 15 denier to 40 denier; 30 to 75% of 40 denier to 100 denier and 20 to 40% of binder fiber of 4 to 15 denier.

18. The filter of claim 15 wherein the recipe includes 10 to 25% polymer fibers of 15 denier to 40 denier; 40 to 60% of 40 denier to 100 denier and 25 to 35% of binder fiber of 4 to 15 denier.

19. The filter of claim 1 wherein the zig-zag shaped row pattern provided on one surface of the filter has about an equal base thickness to projection height ratio and wherein the rows and recesses between the rows are continuous with the rows having a 4.0 to +/−1.5 inch peak to peak distance along a length distance which corresponds to a vertical direction relative to the filter in use; a side to side row spacing of 2.0+/−0.75 inches and wherein there is a slope angle of 40 to 65° in both opposite side walls of each projection, which side walls each slope outward from a central region of the projection in going from a peak of the projection to the interface region of the projection with the base.

20. The filter of claim 19 wherein the slope angle of each side wall is 52.5+/−2.5°.

21. A method of using the filter of claim 8, comprising:
providing the filter in a fluid flow path and removing material in the fluid flow path with the filter.

22. The method of claim 21 wherein providing the filter includes providing the filter to a support in a paint booth such that the filter functions as a paint arrestor.

23. The filter of claim 8 wherein the non-woven fiber filter body is comprised of a common recipe blend of fibers having a majority of the overall fibers of 40 denier to 100 denier and with a binder fiber percentage in the fiber recipe blend being 20 to 40% by weight at 4 to 15 denier.

24. The filter of claim 2 wherein the non-woven fiber filter body is comprised of a recipe of fibers with a majority of the overall fibers being of 40 denier to 100 denier.

25. The filter of claim 8 wherein the non-woven fiber filter body is comprised of a recipe of polymer fibers of 10 to 50% by weight of fibers of 15 denier to 40 denier; 15 to 85% by weight of 40 denier to 100 denier and 15 to 50% by weight of binder fiber of 4 to 15 denier.

26. The filter of claim 25 wherein the binder fiber is a sheath-core binder fiber.

27. The filter of claim 25 wherein the recipe includes 20 to 50% polymer fibers of 15 denier to 40 denier; 30 to 75% of 40 denier to 100 denier and 20 to 40% of binder fiber of 4 to 15 denier.

28. The filter of claim 25 wherein the recipe includes 10 to 25% polymer fibers of 15 denier to 40 denier; 40 to 60% of 40 denier to 100 denier and 25 to 35% of binder fiber of 4 to 15 denier.

29. The filter of claim 8 wherein the zig-zag shaped row pattern provided on one surface of the filter has about an equal base thickness to projection height ratio and wherein the rows are continuous with a 4.0 to +/−1.5 inch peak to peak distance along a length distance which corresponds to a vertical direction relative to the filter in use; a side to side row spacing of 2.0+/−0.75 inches and there is a slope angle of 40 to 65° in the ridges.

30. The filter of claim 29 wherein the slope is 52.5+/−2.5°.

31. The filter of claim 1 wherein the monolithic, non-woven fiber material body is a non-laminated, single layer with an essentially continuous density fiber blend from the convoluted surface to an opposite side of the single layer defining the base.

32. The filter of claim 8 wherein the monolithic, non-woven fiber material body is a non-laminated, single layer with an essentially continuous density fiber blend from the convoluted surface to an opposite side of the single layer defining the base.

33. The filter of claim 15 wherein the rows and recesses are serpentine shaped.

* * * * *